(12) United States Patent
Honda et al.

(10) Patent No.: US 10,074,840 B2
(45) Date of Patent: Sep. 11, 2018

(54) SEPARATOR FOR NON-AQUEOUS SECONDARY BATTERY AND NON-AQUEOUS SECONDARY BATTERY

(71) Applicant: TEIJIN LIMITED, Osaka-shi, Osaka (JP)

(72) Inventors: Susumu Honda, Iwakuni (JP); Takashi Yoshitomi, Iwakuni (JP); Satoshi Nishikawa, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 195 days.

(21) Appl. No.: 14/440,951

(22) PCT Filed: Oct. 25, 2013

(86) PCT No.: PCT/JP2013/079032
§ 371 (c)(1),
(2) Date: May 6, 2015

(87) PCT Pub. No.: WO2014/083988
PCT Pub. Date: Jun. 5, 2014

(65) Prior Publication Data
US 2015/0263325 A1 Sep. 17, 2015

(30) Foreign Application Priority Data

Nov. 30, 2012 (JP) ................................. 2012-262515
Nov. 30, 2012 (JP) ................................. 2012-262516
(Continued)

(51) Int. Cl.
*H01M 2/16* (2006.01)
*H01M 10/0525* (2010.01)
*H01M 10/052* (2010.01)

(52) U.S. Cl.
CPC ......... *H01M 2/1686* (2013.01); *H01M 2/166* (2013.01); *H01M 2/1646* (2013.01);
(Continued)

(58) Field of Classification Search
CPC .. H01M 2/1653; H01M 2/1686; H01M 2/166; H01M 2/1646; H01M 2/162;
(Continued)

(56) References Cited

U.S. PATENT DOCUMENTS

2010/0285348 A1* 11/2010 Murata ................... B32B 27/20
429/144
2011/0052087 A1* 3/2011 Mukherjee ............ H04N 19/46
382/248
(Continued)

FOREIGN PATENT DOCUMENTS

CN 102668172 A 9/2012
JP 2000-30686 A 1/2000
(Continued)

OTHER PUBLICATIONS

Communication dated Aug. 2, 2016 from the State Intellectual Property Office of the P.R.C. in counterpart Application No. 201380061102.8.
(Continued)

*Primary Examiner* — Jayne L Mershon
(74) *Attorney, Agent, or Firm* — Sughrue Mion, PLLC

(57) ABSTRACT

Provided is a separator for a non-aqueous secondary battery, including: a porous substrate, and a heat resistant porous layer that is provided on one side or both sides of the porous substrate, that is an aggregate of resin particles and an inorganic filler, and that satisfies the following expression (1). In expression (1), Vf is a volume proportion (% by volume) of the inorganic filler in the heat resistant porous layer, and CPVC is a critical pigment volume concentration (% by volume) of the inorganic filler. Also provided is a separator for a non-aqueous secondary battery, including: a porous substrate, a heat resistant porous layer that is provided on one side or both sides of the porous substrate, that includes a resin and an filler, and that satisfies the following
(Continued)

expression (2), and an adhesive porous layer that is provided on both sides of a stacked body of the porous substrate and the heat resistant porous layer, and that includes an adhesive resin. In expression (2), Vf is a volume proportion (% by volume) of the filler in the heat resistant porous layer, and CPVC is a critical pigment volume concentration (% by volume) of the filler.

$$0.65 \leq Vf/CPVC \leq 0.99 \quad \text{expression (1)}$$

$$0.40 \leq Vf/CPVC \leq 0.99 \quad \text{expression (2)}$$

15 Claims, 1 Drawing Sheet

(30) Foreign Application Priority Data

| Mar. 19, 2013 | (JP) | 2013-056710 |
| Mar. 19, 2013 | (JP) | 2013-056712 |
| Jun. 12, 2013 | (JP) | 2013-123873 |

(52) U.S. Cl.
CPC ..... *H01M 2/1653* (2013.01); *H01M 10/0525* (2013.01); *H01M 2/162* (2013.01); *H01M 2/1666* (2013.01); *H01M 10/052* (2013.01); *H01M 2220/20* (2013.01); *H01M 2220/30* (2013.01)

(58) Field of Classification Search
CPC ........... H01M 2/1666; H01M 10/0525; H01M 10/052; H01M 2220/30
USPC .................................................. 429/145, 144
See application file for complete search history.

(56) References Cited

U.S. PATENT DOCUMENTS

| 2011/0052987 A1 | 3/2011 | Katayama et al. |
| 2011/0135989 A1* | 6/2011 | Noumi ................ H01M 2/1653 429/144 |
| 2014/0004400 A1* | 1/2014 | Ueki ................... H01M 2/1646 429/94 |

FOREIGN PATENT DOCUMENTS

| JP | 2000-57846 A | 2/2000 |
| JP | 2002-141042 A | 5/2002 |
| JP | 2006-286531 A | 10/2006 |
| JP | 2009-21265 A | 1/2009 |
| JP | 2009-187702 A | 8/2009 |
| JP | 2010-65088 A | 3/2010 |
| JP | 2011-171290 A | 9/2011 |
| JP | WO 2012/124093 | * 9/2012 |
| JP | 2012-529742 A | 11/2012 |
| JP | 5497245 B2 | 5/2014 |
| WO | 2009/044741 A1 | 4/2009 |
| WO | 2012/023197 A1 | 2/2012 |
| WO | 2012/124093 A1 | 9/2012 |
| WO | 2013/133074 A1 | 9/2013 |
| WO | 2013/146126 A1 | 10/2013 |

OTHER PUBLICATIONS

Japanese Office Action for JP 2014-510337 dated Apr. 22, 2014.
Japanese Office Action for JP 2014-510337 dated Aug. 26, 2014.
International Search Report for PCT/JP2013/079032 dated Dec. 10, 2013.

* cited by examiner

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2013/079032 filed Oct. 25, 2013 (claiming priority based on Japanese Patent Application Nos. 2012-262515 filed on Nov. 30, 2012, 2012-262516 filed on Nov. 30, 2012, 2013-056710 filed on Mar. 19, 2013, 2013-056712 filed on Mar. 19, 2013 and 2013-123873 filed on Jun. 12, 2013), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, typified by lithium ion secondary batteries, have been widely used as main power sources for portable electronic devices such as cellular phones or notebook computers. Further, application of non-aqueous secondary batteries has been expanded to main power sources for electric automobiles or hybrid cars, and to systems for storing nighttime electricity. Along with the popularization of non-aqueous secondary batteries, securing stable battery performance and safety has become a challenge.

Separators play an important role in securing safety for a non-aqueous secondary battery. Particularly from the viewpoint of a shutdown function, polyolefin porous membranes having polyolefin as a main component are currently used.

However, a separator which is composed only of a polyolefin porous membrane may be melted in its entirety (a so-called meltdown) when the separator is exposed to a temperature higher than the temperature at which a shutdown function occurs.

Since polyolefin is poorly adhesive to other resins or other materials, adhesion between a polyolefin porous membrane and an electrode is not sufficient, which has caused deterioration in battery capacity or deterioration in cycle characteristics in some cases.

Accordingly, a suggestion has been made to provide a porous layer containing a resin and a filler on one side or both sides of a polyolefin porous membrane for the purpose of improving the heat resistance of a separator or improving the adhesion between an electrode and a separator (see, for example, Patent Documents 1 to 9).

Patent Document 1: Japanese Patent Application Laid-Open (JP-A) No. 2000-030686
Patent Document 2: Japanese National-Phase Publication (JP-A) No. 2012-529742
Patent Document 3: JP-A No. 2011-171290
Patent Document 4: JP-A No. 2010-065088
Patent Document 5: JP-A No. 2000-057846
Patent Document 6: JP-A No. 2009-021265
Patent Document 7: JP-A No. 2006-286531
Patent Document 8: JP-A No. 2009-187702
Patent Document 9: JP-A No. 2002-141042

SUMMARY OF INVENTION

Technical Problem

Although a variety of separators for non-aqueous secondary batteries have hitherto been proposed, further improvement in performance is demanded; for example, separators excellent both in ion permeability and thermal dimensional stability or separators having heat resistance, adhesion to an electrode and ion permeability in good balance are demanded.

The present invention has been made under the above-mentioned circumstances.

An object of a first embodiment of the present invention is to provide a separator for a non-aqueous secondary battery having excellent ion permeability and excellent thermal dimensional stability, and a non-aqueous secondary battery having excellent battery characteristics and high safety, and the first embodiment of the present invention aims to attain the object.

An object of a second embodiment of the present invention is to provide a separator for a non-aqueous secondary battery having heat resistance, adhesion to an electrode and ion permeability in a good balance, and a non-aqueous secondary battery having excellent battery characteristics and high safety, and the second embodiment of the present invention aims to attain the object.

Solution to Problem

The first embodiment of the present invention employs the following configuration in order to solve the problem.

<1> A separator for a non-aqueous secondary battery, including:
a porous substrate, and
a heat resistant porous layer that is provided on one side or both sides of the porous substrate, that is an aggregate of resin particles and an inorganic filler, and that satisfies the following expression (1).

$$0.65 \leq Vf/CPVC \leq 0.99 \qquad \text{expression (1)}$$

In expression (1), Vf is a volume proportion (% by volume) of the inorganic filler in the heat resistant porous layer, and CPVC is a critical pigment volume concentration (% by volume) of the inorganic filler.

<2> The separator for a non-aqueous secondary battery according to <1>, wherein the heat resistant porous layer has a porosity of from 40% to 70%.
<3> The separator for a non-aqueous secondary battery according to <1>, wherein a product, of the porosity of the heat resistant porous layer and Vf/CPVC, is from 40% to 60%.
<4> The separator for a non-aqueous secondary battery according to any one of <1> to <3>, wherein a content of the inorganic filler in the heat resistant porous layer is from 2.0 g/m² to 20.0 g/m².
<5> The separator for a non-aqueous secondary battery according to any one of <1> to <4>, wherein the critical pigment volume concentration of the inorganic filler is from 20% by volume to 70% by volume.
<6> The separator for a non-aqueous secondary battery according to any one of <1> to <5>, wherein:
the porous substrate includes a thermoplastic resin, and
in a case in which the separator for a non-aqueous secondary battery is heated at a rate of temperature increase of 5° C./min. to a flow elongation deformation temperature of the thermoplastic resin, the separator for a non-aqueous secondary battery exhibits a thermal dimensional change ratio in a longitudinal direction of 3% or less and a thermal dimensional change ratio in a width direction of 3% or less.

<7> The separator for a non-aqueous secondary battery according to any one of <1> to <6>, wherein in a case in which the separator for a non-aqueous secondary battery is subjected to a heat treatment at 150° C. for 30 minutes are 3% or less, the separator for a non-aqueous secondary battery exhibits a thermal shrinkage ratio in a longitudinal direction of 3% or less and a thermal shrinkage ratio in a width direction of 3% or less.

<8> The separator for a non-aqueous secondary battery according to any one of <1> to <7>, wherein the resin particles are resin particles include a polyvinylidene fluoride resin.

<9> The separator for a non-aqueous secondary battery according to any one of <1> to <8>, wherein the inorganic filler is magnesium hydroxide or magnesium oxide.

<10> The separator for a non-aqueous secondary battery according to any one of <1> to <9>, wherein the proportion of the inorganic filler with respect to the total amount of the resin particles and the inorganic filler is from 65% by mass to 99% by mass.

<11> The separator for a non-aqueous secondary battery according to any one of <1> to <10>, wherein a content of the resin particles in the heat resistant porous layer is from 0.5% by mass to 30% by mass.

<12> The separator for a non-aqueous secondary battery according to any one of <1> to <11>, wherein the heat resistant porous layer further includes a thickener.

<13> A non-aqueous secondary battery including a positive electrode, a negative electrode, and the separator for a non-aqueous secondary battery according to any one of <1> to <12>, which is disposed between the positive electrode and the negative electrode, wherein, in the non-aqueous secondary battery, electromotive force is obtained by lithium doping/dedoping.

The second embodiment of the present invention employs the following configuration in order to solve the problem.

<101> A separator for a non-aqueous secondary battery, including:

a porous substrate, a heat resistant porous layer that is provided on one side or both sides of the porous substrate, that includes a resin and an filler and that satisfies the following expression (2), and an adhesive porous layer that is provided on both sides of a stacked body of the porous substrate and the heat resistant porous layer, and that includes an adhesive resin.

$$0.40 \leq Vf/CPVC \leq 0.99 \qquad \text{expression (2)}$$

In expression (2), Vf is a volume proportion (% by volume) of the filler in the heat resistant porous layer, and CPVC is a critical pigment volume concentration (% by volume) of the filler.

<102> The separator for a non-aqueous secondary battery according to <101>, wherein an average of a porosity of the heat resistant porous layer and a porosity of the adhesive porous layer is from 30% to 70%.

<103> The separator for a non-aqueous secondary battery according to <101> or <102>, wherein, in the heat resistant porous layer, a proportion of the filler with respect to a total amount of the resin and the filler is from 50% by mass to 98% by mass.

<104> The separator for a non-aqueous secondary battery according to any one of <101> to <103>, wherein the critical pigment volume concentration of the filler is from 20% by volume to 80% by volume.

<105> The separator for a non-aqueous secondary battery according to any one of <101> to <104>, wherein the peel strength between the heat resistant porous layer and the adhesive porous layer is 0.05 N/cm or more.

<106> The separator for a non-aqueous secondary battery according to any one of <101> to <105>, wherein as the resin is resin particles including a polyvinylidene fluoride resin, the filler is an inorganic filler, and the heat resistant porous layer is an aggregate of the resin particles and the inorganic filler.

<107> The separator for a non-aqueous secondary battery according to any one of <101> to <106>, wherein the filler is magnesium hydroxide or magnesium oxide.

<108> The separator for a non-aqueous secondary battery according to any one of <101> to <107>, wherein the porous substrate includes a thermoplastic resin.

<109> The separator for a non-aqueous secondary battery according to any one of <101> to <108>, wherein a content of the resin in the heat resistant porous layer is from 1% by mass to 50% by mass.

<110> The separator for a non-aqueous secondary battery according to any one of <101> to <109>, wherein the adhesive porous layer includes a polyvinylidene fluoride resin.

<111> The separator for a non-aqueous secondary battery according to any one of <101> to <110>, wherein the heat resistant porous layer further includes a thickener.

<112> A non-aqueous secondary battery including a positive electrode, a negative electrode, and the separator for a non-aqueous secondary battery according to any one of <101> to <111>, which is disposed between the positive electrode and the negative electrode, wherein, in the non-aqueous secondary battery, electromotive force is obtained by lithium doping/dedoping.

Advantageous Effects of Invention

According to the first embodiment of the present invention, a separator for a non-aqueous secondary battery having excellent ion permeability and excellent thermal dimensional stability, and a non-aqueous secondary battery having excellent battery characteristics and high safety are provided.

According to the second embodiment of the present invention, a separator for a non-aqueous secondary battery having heat resistance, adhesion to electrodes, and ion permeability in good balance, and a non-aqueous secondary battery having excellent battery characteristics and high safety are provided.

DESCRIPTION OF EMBODIMENTS

Figure 1:
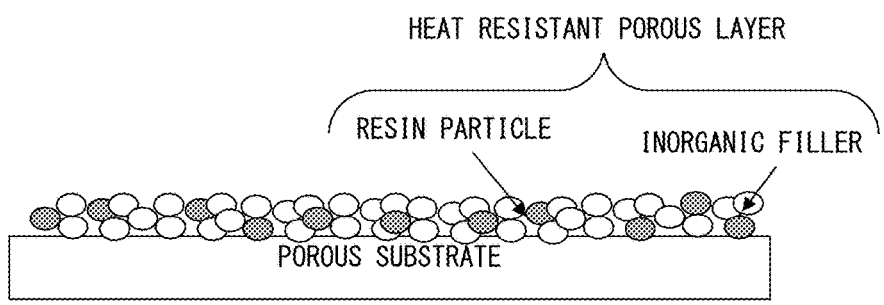
FIG. 1 shows a schematic cross-sectional view of one embodiment of the present invention.
Figure 2:
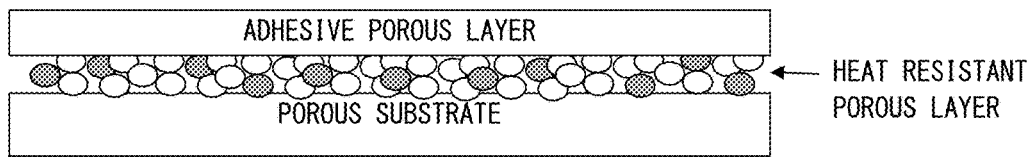
FIG. 2 shows a schematic cross-sectional view of another embodiment of the present invention.

Hereinafter, embodiments of the present invention will be described. It is noted that such descriptions and Examples exemplify the present invention, and do not limit the scope of the present invention.

Numerical ranges indicated by using "to" refer to ranges including values before and after "to" as the minimum value and the maximum value, respectively.

The term "process" herein not only means an independent process but also encompasses in its scope a process which is not clearly distinguished from other processes as long as a desired effect thereof is attained.

The term "(meth)acrylic" herein means "acrylic" or "methacrylic".

Herein, with respect to a separator for a non-aqueous secondary battery, a "longitudinal direction" means a direction of the longer side of a separator manufactured in a long shape, and a "width direction" means a direction orthogonal to the longitudinal direction of a separator. The "longitudinal direction" is also referred to as "MD direction", and the "width direction" is also referred to as "TD direction".

Herein the "heat resistance" means characteristics in which melting or decomposition does not occur in a temperature range of 200° C. or lower.

Hereinafter, two forms of a separator for a non-aqueous secondary battery (hereinafter, also referred to as "separator") according to the present invention are described.

<Separator for Non-Aqueous Secondary Battery According to First Embodiment>

A separator according to a first embodiment includes a porous substrate and a heat resistant porous layer provided on one side or both sides of the porous substrate. The heat resistant porous layer is an aggregate of resin particles and an inorganic filler, and satisfies the following expression (1).

$$0.65 \leq Vf/\text{CPVC} \leq 0.99 \quad \text{Expression (1)}$$

In expression (1), Vf is the volume proportion (% by volume) of the inorganic filler in the heat resistant porous layer, and CPVC is the critical pigment volume concentration (% by volume) of the inorganic filler.

The heat resistant porous layer which the separator according to the first embodiment includes is an aggregate that is in a layer shape and is formed by coupling plural resin particles and plural inorganic filler particles, and, with the heat resistant porous layer, surface pores of the porous substrate are less likely to be occluded, whereby the separator according to the first embodiment has an excellent ion permeability.

In the separator according to the first embodiment, with regard to the inorganic filler contained in the heat resistant porous layer, the ratio Vf/CPVC of the volume proportion (% by volume) of the inorganic filler to the CPVC (critical pigment volume concentration) (% by volume) of the inorganic filler is from 0.65 to 0.99. When the Vf/CPVC is 0.65 or larger, both the ion permeability and the thermal dimensional stability of the separator are excellent. From this point of view, Vf/CPVC is preferably 0.70 or larger, and more preferably 0.80 or larger. On the other hand, when the Vf/CPVC is 0.99 or less, the inorganic filler is less likely to fall off from the heat resistant porous layer, and the heat resistant porous layer is less likely to be peeled off from the porous substrate. Accordingly, the thermal dimensional stability can be maintained. From this point of view, the Vf/CPVC is preferably 0.985 or less, and more preferably 0.98 or less.

The CPVC (critical pigment volume concentration) of the inorganic filler is a physical property obtained by measuring the linseed oil absorption amount per unit mass in accordance with JIS K-5101-13-1 (2004) and calculating using the following formula.

CPVC (% by volume) of inorganic filler=linseed oil absorption amount per unit mass (ml/g)×specific gravity (g/cm$^3$) of inorganic filler×100

The CPVC of the inorganic filler is a physical property determined by synthesizing factors such as the material properties, particle size, particle size distribution, shape and the like of the inorganic filler, and can be controlled by adjusting each of these factors. For example, the CPVC can be adjusted by pulverizing the inorganic filler or adding thereto an inorganic filler having a different particle size.

The volume proportion Vf of the inorganic filler in the heat resistant porous layer is calculated by the following formula.

volume proportion $Vf$ (% by volume) of inorganic filler=volume per unit area (cm$^3$/m$^2$) of inorganic filler÷volume per unit area (cm$^3$/m$^2$) of heat resistant porous layer×100

The volume per unit area (cm$^3$/m$^2$) of the inorganic filler is determined by dividing the weight per unit area (g/m$^2$) of the inorganic filler by the specific gravity (g/cm$^3$) of the inorganic filler. The volume per unit area (cm$^3$/m$^2$) of the heat resistant porous layer is determined by the product of the thickness of the heat resistant porous layer and the unit area. The weight per unit area (g/m$^2$) of the inorganic filler may also be determined by the weight per unit area (basis weight, g/m$^2$) of the heat resistant porous layer and the composition of the heat resistant porous layer, or may be determined by TGA (thermogravimetric analysis).

The volume proportion Vf of the inorganic filler in the heat resistant porous layer can be controlled by the composition or porosity of the heat resistant porous layer.

Hereinafter, components of the separator according to the first embodiment, and ingredients contained in each of the components are described.

[Porous Substrate]

In the invention, the term "porous substrate" means a substrate having pores or voids inside. Examples of such a substrate include a microporous membrane; a porous sheet formed of a fibrous material, such as nonwoven fabric or a paper-like sheet; and the like. Particularly from the viewpoints of thinning of a separator and high strength, a microporous membrane is preferable. The "microporous membrane" means a membrane that has a large number of micropores inside, and has a structure in which these micropores are joined, to allow gas or liquid to pass therethrough from one side to the other side.

The material used as a component of the porous substrate may be an organic material or an inorganic material as long as the material is an electrically insulating material.

The material used as a component of the porous substrate is preferably a thermoplastic resin from the viewpoint of imparting a shutdown function to the porous substrate. The term "shutdown function" refers to the following function. Namely, in a case in which the battery temperature increases, the thermoplastic resin melts and blocks the pores of the porous substrate, thereby blocking migration of ions, to prevent thermal runaway of the battery. Examples of the thermoplastic resin include polyesters such as polyethylene terephthalate; and polyolefins such as polyethylene and polypropylene. As the thermoplastic resin, a resin having a flow elongation deformation temperature of lower than 200° C. is preferable from the viewpoint of imparting a shutdown function.

In the present invention, the flow elongation deformation temperature of the thermoplastic resin is a temperature at which the elongation percentage (=elongation amount÷initial sample length×100) is 15% when the temperature of a sample is increased at a constant rate while a constant tensile force is applied thereto to measure the elongation of the sample. Specifically, the flow elongation deformation temperature is a temperature determined by the following method.

A porous substrate formed of a thermoplastic resin is cut into a 3 mm (TD direction)×16 mm (MD direction) piece and a 3 mm (MD direction)×16 mm (TD direction) piece. A sample is placed into a TMA measurement device, a TMA (thermomechanical analysis) is performed at a temperature-rising rate of 5° C./min. while applying a load of 19.6 mN in the longitudinal direction of the sample, and a TMA chart is prepared by plotting the temperature along the horizontal axis and the sample length along the vertical axis for each of the MD direction and the TD direction. For each of the MD direction and the TD direction, the temperature at which the elongation percentage of the sample reaches 15% is determined from the TMA chart, and the average of the temperatures for the MD direction and the TD direction is calculated, thereby obtaining the flow elongation deformation temperature of the thermoplastic resin that is a component of the porous substrate.

As the porous substrate, a microporous membrane (referred to as "polyolefin microporous membrane") including polyolefin is preferable. As the polyolefin microporous membrane, a polyolefin microporous membrane which has sufficient mechanical characteristic and ion permeability may be selected from polyolefin microporous membranes which have been applied to a conventional separator for a non-aqueous secondary battery.

From the viewpoint of exhibiting the shutdown function, the polyolefin microporous membrane preferably includes polyethylene, and the content of polyethylene is preferably 95% by mass or larger.

From the viewpoint of imparting heat resistance to such a degree that the membrane does not easily break when exposed to high temperatures, a polyolefin microporous membrane including polyethylene and polypropylene is preferable. An example of such a polyolefin microporous membrane is a microporous membrane in which polyethylene and polypropylene are present as a mixture in one layer. In such a microporous membrane, it is preferable that polyethylene is contained in an amount of 95% by mass or more and polypropylene is contained in an amount of 5% by mass or less, from the viewpoint of achieving both the shutdown function and heat resistance. From the viewpoint of achieving both the shutdown function and heat resistance, a polyolefin microporous membrane having a multi-layer structure of two or more layers, in which at least one layer includes polyethylene and at least one layer includes propylene, is also preferable.

It is preferable that the polyolefin contained in the polyolefin microporous membrane has a weight average molecular weight of from 100,000 to 5,000,000. When the weight average molecular weight is 100,000 or more, sufficient mechanical characteristics can be ensured. When the weight average molecular weight is 5,000,000 or less, the shutdown characteristics are favorable, and it is easy to form a membrane.

The polyolefin microporous membrane can be manufactured, for example, by the following method. Namely, the polyolefin microporous membrane can be manufactured by a method in which a molten polyolefin resin is extruded through a T-die to form a sheet, the sheet is subjected to a crystallization treatment, followed by stretching, and further is subjected to a heat treatment, thereby obtaining a microporous membrane. Alternatively, the polyolefin microporous membrane can be manufactured by a method in which a polyolefin resin melted together with a plasticizer such as liquid paraffin is extruded through a T-die, followed by cooling, to form a sheet, the sheet is stretched, the plasticizer is extracted from the sheet, and the sheet is subjected to a heat treatment, thereby obtaining a microporous membrane.

Examples of the porous sheet formed of a fibrous material include a porous sheet formed of a nonwoven fabric formed of fibrous material of a thermoplastic resin, a paper, or the like.

From the viewpoint of obtaining favorable mechanical characteristics and internal resistance, the thickness of the porous substrate is preferably from 3 μm to 25 μm, and more preferably from 5 μm to 25 μm.

From the viewpoints of preventing a short circuit in a battery and obtaining ion permeability, the Gurley value (JIS P8117(2009)) of the porous substrate is preferably from 50 sec/100 cc to 800 sec/100 cc, and more preferably from 50 sec/100 cc to 400 sec/100 cc.

From the viewpoint of obtaining an appropriate film resistance and shutdown function, the porosity of the porous substrate is preferably from 20% to 60%.

From the viewpoint of improving the production yield, the piercing strength of the porous substrate is preferably 300 g or more.

For the purpose of improving wettability with a coating liquid for forming a heat resistant porous layer or an adhesive porous layer, the surface of the porous substrate may be subjected to a corona treatment, a plasma treatment, a flame treatment, an ultraviolet irradiation treatment, or the like.

[Heat Resistant Porous Layer]

The separator according to the first embodiment includes a heat resistant porous layer on one side or both sides of the porous substrate. When the separator has a heat resistant porous layer only on one side of the porous substrate, the thickness of the whole separator can be minimized, thereby contributing to improvement of the battery capacity, and favorable ion permeability can be easily obtained due to a small number of layers. On the other hand, when the heat resistant porous layer is provided on both sides of the porous substrate, the heat resistance of the separator is more excellent, and safety of a battery can be improved. When the heat resistant porous layer is provided on both sides of the porous substrate, a curl is less likely to be generated on the separator.

In the first embodiment, the heat resistant porous layer is an aggregate of resin particles and inorganic fillers. In other words, plural resin particles and plural inorganic filler particles are joined to form a layered aggregate, and the aggregate is fixed on the surface of the porous substrate via at least part of the resin particles. The aggregate has a porous structure in a layer shape as a whole, and gas or liquid can pass from one side to the other side. Resin particles in the aggregate are preferably joined with each other and with the inorganic filler. The resin particle retaining its particle shape can be confirmed by observing the surface of the heat resistant porous layer with an SEM (scanning electron microscope).

—Resin Particles—

As the resin particle, a particle that is stable with respect to an electrolyte, that is electrochemically stable, and that has a function of joining an inorganic filler is preferable. Specific examples of the resin particle include a particle including a resin such as a polyvinylidene fluoride resin, fluoro rubber, styrene-butadiene rubber, ethylene-acrylate copolymer, ethylene-acrylic acid copolymer, polyethylene, ethylene-vinyl acetate copolymer, and a cross-linked acrylic resin. Among them, a particle including a polyvinylidene fluoride resin is preferable from the viewpoint that the particle has an excellent oxidation resistance.

Examples of the polyvinylidene fluoride resin include homopolymers of vinylidene fluoride (polyvinylidene fluoride), and copolymers of vinylidene fluoride and another monomer (polyvinylidene fluoride copolymer), a mixture of polyvinylidene fluoride and an acrylic polymer, and a mixture of a polyvinylidene fluoride copolymer and an acrylic polymer.

Examples of the monomer that is copolymerizable with vinylidene fluoride include vinyl fluoride, chlorotrifluoroethylene, tetrafluoroethylene, hexafluoropropylene, trifluoroethylene, trichloroethylene, trifluoroperfluoropropylether, ethylene, (meth)acrylic acid, methyl (meth)acrylate, (meth)acrylic acid ester, vinyl acetate, vinyl chloride, and acrylonitrile. These monomers may be used singly or in combination of two or more thereof.

The weight-average molecular weight of each polyvinylidene fluoride and a polyvinylidene fluoride copolymer, as a component of the resin particle, is preferably from 1,000 to 5,000,000, more preferably from 10,000 to 2,000,000, and further preferably from 50,000 to 1,000,000. Each of polyvinylidene fluoride and a polyvinylidene fluoride copolymer can be synthesized by emulsion polymerization or suspension polymerization.

Examples of acrylic polymer as a component of the resin particle include a poly(meth)acrylic acid, a poly(meth)acrylic acid salt, a poly(meth)acrylic acid ester, a cross-linked poly(meth)acrylic acid, a cross-linked poly(meth)acrylate, and a cross-linked poly(meth)acrylic acid ester, and a modified acrylic polymer may be used. These acrylic polymers may be used singly or in combination of two or more thereof.

As a resin that is a component of the resin particle, it is preferable to use polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, or a mixture of a polyvinylidene fluoride copolymer and an acrylic polymer. From the viewpoint of obtaining mechanical strength with which a battery can withstand an applied pressure or heat during its manufacture, the polyvinylidene fluoride copolymer is preferably a copolymer that includes structural units derived from vinylidene fluoride in an amount of 50 mole % or more.

From the viewpoint of oxidation resistance, each of the mixture of polyvinylidene fluoride and an acrylic polymer and the mixture of a polyvinylidene fluoride copolymer and an acrylic polymer, as a component of the resin particle, preferably include polyvinylidene fluoride or a polyvinylidene fluoride copolymer in an amount of 20% by mass or more.

From the viewpoint of handling properties or manufacturability, the volume average particle diameter of the resin particles is preferably from 0.01 μm to 1 μm, more preferably from 0.02 μm to 1 μm, and further preferably from 0.05 μm to 1 μm.

The content of the resin particles in the heat resistant porous layer is preferably from 0.5% by mass to 30% by mass. When the content of the resin particle is 0.5% by mass or more, an inorganic filler is less likely to fall off from the heat resistant porous layer, and the heat resistant porous layer is less likely to be peeled off from the porous substrate. From this point of view, the content of the resin particle is more preferably 1% by mass or more, further preferably 3% by mass or more, and still further preferably 5% by mass or more. On the other hand, when the content of the resin particle is 30% by mass or less, the thermal dimensional stability and ion permeability of the separator are more excellent. From this point of view, the content of the resin particle is more preferably 25% by mass or less, and further preferably 20% by mass or less.

—Inorganic Filler—

As the inorganic filler, an inorganic filler which is stable to en electrolyte and which is electrochemically stable is preferable. Examples of the inorganic filler include metal hydroxides such as aluminium hydroxide, magnesium hydroxide, calcium hydroxide, chromium hydroxide, zirconium hydroxide, cerium hydroxide, nickel hydroxide, or boron hydroxide; metal oxides such as alumina or zirconia; carbonates such as calcium carbonate or magnesium carbonate; sulfates such as barium sulfate or calcium sulfate; and clay minerals such as calcium silicate or talc. Among them, metal hydroxides metal oxides are preferable, and from the viewpoint of imparting flame resistance or an effect of electricity removal, metal hydroxides and metal oxides are preferable, and magnesium hydroxide is particularly preferable. An inorganic filler that is surface-modified with a silane coupling agent or the like can also be used. The inorganic fillers may be used singly or in combination of two or more thereof.

The CPVC of the inorganic filler is preferably from 20% by volume to 70% by volume. When the CPVC of the inorganic filler is 70% by volume or less, pores are less likely to be occluded at the interface of a porous substrate and a heat resistant porous layer, and the separator has more favorable ion permeability. When the CPVC of the inorganic filler is 70% by volume or less, the inorganic filler is less likely to fall off from the heat resistant porous layer. From these points of view, the CPVC of the inorganic filler is more preferably 65% by volume or less, further preferably 60% by volume or less, and still further preferably 50% by volume or less. On the other hand, when the CPVC of the inorganic filler is 20% by volume or more, the coating liquid has favorable coating properties in cases in which the heat resistant porous layer is formed by wet coating, and, therefore, occurrence of defects such as coating lines is suppressed. From this point of view, the CPVC of the inorganic filler is more preferably 30% by volume or more, and further preferably 40% by volume or more.

The volume average particle diameter of the inorganic filler is preferably from 0.01 μm to 10 μm. The lower limit thereof is more preferably 0.1 μm, and the upper limit thereof is more preferably 5 μm.

The particle size distribution of the inorganic filler is preferably 0.1 μm<d90−d10<3 μm. Here, d10 represents the particle diameter (μm) to which the cumulative total of the particles in the particle size distribution from the smaller particle size side is 10% by mass, and d90 represents the particle diameter (μm) to which the cumulative total of the particles in the particle size distribution from the particle size side is 10% by mass. The particle size distribution measurement is performed, for example, by using a laser diffraction particle size analyzer, by using water as a dispersion medium, and by using as needed a nonionic surfactant (for example, Triton X-100) as a dispersant.

The particle shape of the inorganic filler may be any shape, and may be spherical, elliptical, plate-shaped, rod-shaped, or irregular. From the viewpoint of preventing a short circuit of a battery, the inorganic filler is preferably plate-shaped particles or primary particles that are not aggregated.

The content of the inorganic filler in the heat resistant porous layer is preferably from 2.0 g/m² to 20.0 g/m². When the content of the inorganic filler is 2.0 g/m² or more, the thermal dimensional stability of the separator is more excellent. From this point of view, the content of the inorganic filler is more preferably 2.5 g/m² or more, and further preferably 3.0 g/m² or more. On the other hand, when the content of the inorganic filler is 20.0 g/m² or less, the heat resistant porous layer is less likely to be peeled off from the porous substrate. From this point of view, the content of the inorganic filler is more preferably 15.0 g/m² or less, and further preferably 12.0 g/m² or less.

In the heat resistant porous layer, the inorganic filler preferably accounts for from 65% by mass to 99% by mass of the total amount of resin particles and inorganic fillers. When the proportion of the inorganic filler is 65% by mass or more, the thermal dimensional stability and ion permeability of the separator are excellent. From this point of view, the proportion of the inorganic filler is more preferably 70% by mass or more, further preferably 73% by mass or more, still further preferably 75% by mass or more, and still further preferably 80% by mass or more. On the other hand, when the proportion of the inorganic filler is 99% by mass or less, the inorganic filler is less likely to fall off from the heat resistant porous layer, and the heat resistant porous layer is less likely to be peeled off from the porous substrate. From this point of view, the proportion of the inorganic filler is more preferably 98.5% by mass or less, and still further preferably 98% by mass or less.

—Thickener—

The heat resistant porous layer may include a thickener. In the heat resistant porous layer that is formed of a coating liquid including a thickener, unevenness of the resin particles and inorganic fillers is suppressed.

Example of the thickener include resins such as cellulose, polyvinyl alcohol, polyvinyl butyral, polyvinyl pyrrolidone, polyethylene glycol, polypropylene glycol, polyacrylic acid, higher alcohols, and salts thereof. Among them, cellulose and cellulose salts are preferable. For example, carboxymethylcellulose, hydroxyethylcellulose, hydroxypropylcellulose, methylcellulose, and a sodium salt or ammonium salt thereof are preferable.

From the viewpoint of the thermal dimensional stability, moisture content, and ion permeability of the separator, the proportion of the thickener with respect to the total amount of the resin particles, inorganic filler, and thickener is preferably 10% by mass or less, more preferably 5% by mass or less, and further preferably 3% by mass or less. From the viewpoint of suppressing unevenness of the resin particles and inorganic fillers in the heat resistant porous layer to improve ion permeability, the proportion of the thickener with respect to the total amount of the resin particles, inorganic fillers, and thickener is preferably 0.1% by mass or more, more preferably 0.3% by mass or more, and further preferably 0.5% by mass or more.

—Other Ingredients—

The heat resistant porous layer may include ingredients other than the above-mentioned compounds without inhibiting the effect of the present invention. Examples of the ingredients include a dispersant, a wetting agent, an antifoaming agent, and a pH adjusting agent which can be added to a coating liquid for forming the heat resistant porous layer. It is noted that the resin particles and the inorganic filler preferably account for 90% by mass or more of the total amount of the heat resistant porous layer.

[Method of Forming Heat Resistant Porous Layer]

A method of forming the heat resistant porous layer on the porous substrate is not particularly limited. From the viewpoint of efficiently manufacturing the separator, the following method is preferable. Namely, the preferable method is a method including: a coating process of coating a water-based dispersion including resin particles and an inorganic filler on one side or both sides of a porous substrate; and a drying process of drying the coated water-based dispersion.

Coating Process

The coating process is a process in which a water-based dispersion including resin particles and an inorganic filler is coated on one side or both sides of a porous substrate.

The water-based dispersion is a coating liquid for forming a heat resistant porous layer, and is prepared by dispersing, suspending, or emulsifying resin particles and an inorganic filler in a solvent. As the solvent of the water-based dispersion, at least water is used, and further, a solvent other than water may be added. The solvent other than water is not particularly limited as long as the solvent does not dissolve the resin particles and is capable of dispersing or suspending the resin particles in the solid state or emulsifying the resin particles. Examples thereof include organic solvents such as methanol, ethanol, 2-propanol, acetone, tetrahydrofuran, methyl ethyl ketone, ethyl acetate, N-methylpyrrolidone, dimethylacetamide, dimethylformamide, or dimethylformamide. From the viewpoints of low environmental load, safety, and economy, it is preferable to use a water-based emulsion obtained by emulsifying the resin particles and the inorganic filler in water or in a mixed liquid of water and alcohol.

The water-based dispersion may include a thickener for the purpose of adjusting the viscosity to a value appropriate for coating on a porous substrate. The water-based dispersion may include a dispersant such as a surfactant for the purpose of enhancing the dispersibilities of the resin particles and inorganic filler. The water-based dispersion may include a wetting agent for the purpose of improving the conformity with a porous substrate. The water-based dispersion may also include an antifoaming agent or a pH adjusting agent. Such additives may remain in a battery as long as the additives are electrochemically stable under circumstances in which the battery is used and as long as the additives do not inhibit a reaction in the battery.

The content of the resin particles in the water-based dispersion is preferably from 1% by mass to 25% by mass. The content of the inorganic filler in the water-based dispersion is preferably from 2% by mass to 50% by mass.

For coating the water-based dispersion onto a porous substrate, a conventional coating system using a Mayer bar, a die coater, a reverse roll coater, a gravure coater, a microgravure coater, spray coating, or the like may be applied. In the case of forming a heat resistant porous layer on both sides of the porous substrate, the water-based dispersion may be coated on one side, then on the other side, and then subjected to drying, or may be coated simultaneously on both sides of the porous substrate, and then subjected to drying. From the viewpoint of productivity, the latter is preferable.

Drying Process

The drying process is a process in which the water-based dispersion that has been coated on a porous substrate in the coating process is dried. By drying the water-based dispersion, the solvent is removed, and the resin particle functions as a binder, whereby the heat resistant porous layer is fixed to the porous substrate.

The above mentioned forming method is a method in which a heat resistant porous layer is directly formed on a porous substrate by a wet coating method. Alternatively, a heat resistant porous layer can be formed on a porous substrate by a method of bonding a sheet of a heat resistant porous layer which is separately manufactured on a porous substrate using adhesives or the like or also by a method of heat sealing or compression bonding.

[Characteristics of Heat Resistant Porous Layer]

From the viewpoint of heat resistance and handling properties, the thickness of the heat resistant porous layer is preferably 0.5 µm or more per one side, and more preferably 1 µm or more per one side, and from the viewpoint of handling properties and battery capacity, the thickness of the heat resistant porous layer is preferably 15 µm or less per one side, and more preferably 10 µm or less per one side. Both in cases in which a heat resistant porous layer is provided on one side of a porous substrate and in cases in which a heat resistant porous layer is provided on both sides of a porous substrate, the lower limit of the sum of the thicknesses is preferably 1 µm, more preferably 2 µm, and further preferably 3 µm, and the upper limit thereof is preferably 20 µm, more preferably 15 µm, and further preferably 12 µm.

The porosity of the heat resistant porous layer is preferably from 40% to 70%. When the porosity of the heat resistant porous layer is 40% or more, ion permeability of the separator is more excellent. From this point of view, the porosity is more preferably 45% or more, further preferably 50% or more, and still further preferably 55% or more. On the other hand, when the porosity of the heat resistant porous layer is 70% or less, the thermal dimensional stability of the separator is more excellent. From this point of view, the porosity is more preferably 68% or less, and further preferably 65% or less.

In the heat resistant porous layer, the product of the porosity and the Vf/CPVC is preferably from 40% to 60%. When the product is in the above range, both the ion permeability and the thermal dimensional stability of the separator can be easily attained. The lower limit thereof is more preferably 43%, further preferably 45%, and the upper limit thereof is more preferably 55%, and further preferably 50%.

[Characteristics of Separator According to First Embodiment]

From the viewpoint of the mechanical strength and the energy density of a battery, the thickness of the separator according to the first embodiment is preferably from 5 µm to 35 µm, more preferably from 5 µm to 30 µm, and further preferably from 10 µm to 25 µm.

From the viewpoint of mechanical strength, handling properties, and ion permeability, the porosity of the separator according to the first embodiment is preferably from 30% to 60%.

In view of good balance between the mechanical strength and the ion permeability, the Gurley value (JIS P8117 (2009)) of the separator according to the first embodiment is preferably from 50 sec/100 cc to 800 sec/100 cc, more preferably from 100 sec/100 cc to 500 sec/100 cc, and further preferably from 100 sec/100 cc to 400 sec/100 cc.

From the viewpoint of short circuit prevention, mechanical strength, and handling properties, the piercing strength of the separator according to the first embodiment is preferably from 250 g to 1000 g, more preferably from 300 g to 1000 g, and further preferably from 300 g to 600 g.

From the viewpoint of the load characteristic of a battery, the film resistance of the separator according to the first embodiment is preferably from 0.5 ohm·cm$^2$ to 10 ohm·cm$^2$, and more preferably from 1 ohm·cm$^2$ to 8 ohm·cm$^2$.

In a case in which the separator according to the first embodiment is subjected to a heat treatment at 150° C. for 30 minutes, the thermal shrinkage ratio of the separator according to the first embodiment in both the MD direction and the TD direction is preferably 3% or less, and more preferably 2% or less. When the thermal shrinkage ratio is in this range, the shape stability of a separator is high, thereby providing a battery in which a short circuit is less likely to occur even when exposed to high temperatures.

In a case in which the separator is heated at a rate of temperature increase of 5° C./min. to the flow elongation deformation temperature of the thermoplastic resin, the thermal dimensional change ratio of the separator according to the first embodiment in the MD direction is preferably 3% or less, and more preferably 2% or less. When the thermal dimensional change ratio in the MD direction is in this range, a thermal strain in the MD direction of the separator is small in a battery manufactured by winding a separator and an electrode in the longitudinal direction, and, therefore, a battery having a high heat resistance can be provided.

In a case in which the separator according to the first embodiment is heated at a rate of temperature increase of 5° C./min. to the flow elongation deformation temperature of the thermoplastic resin, the thermal dimensional change ratio of the separator according to the first embodiment in the TD direction is preferably 3% or less, and more preferably 2% or less. When the thermal dimensional change ratio in the TD direction is in this range, the thermal strain of the separator in the TD direction is small in a battery (cylindrical type battery, square type battery, laminate battery, or the like) manufactured by stacking a separator and an electrode together, and, therefore, it is possible to provide a battery having a high heat resistance. The width of the separator does not need to be adjusted anticipating a thermal deformation of the separator in the TD direction, thereby also contributing to the improvement of the battery capacity.

Specifically, the thermal dimensional change ratio is a temperature determined by the following method. A separator is cut into a 3 mm (TD direction)×16 mm (MD direction) piece and a 3 mm (MD direction)×16 mm (TD direction) piece. A sample is placed into a TMA measurement device, a TMA (thermomechanical analysis) is performed under the conditions such that the temperature-rising rate is 5° C./min. and the target temperature is a flow elongation deformation temperature of thermoplastic resin, while applying a load of 19.6 mN in the longitudinal direction of the sample, and a TMA chart is prepared by plotting the temperature along the horizontal axis and the sample length along the vertical axis for each of the MD direction and the TD direction. From the TMA chart, the maximum change amount of the separator is extracted, and the absolute value of the maximum change amount is defined as a maximum deformation amount, and the thermal dimensional change ratio is calculated by the following formula.

thermal dimensional change ratio (%) in *MD* direction=(maximum deformation amount in *MD* direction)/(length in *MD* direction before heating)×100 thermal dimensional change ratio (%) in *TD* direction=(maximum deformation amount in *TD* direction)/((length in *TD* direction before heating)×100

The thermal shrinkage ratio and thermal dimensional change ratio of the separator according to the first embodiment can be controlled by, for example, the content of the inorganic filler in the heat resistant porous layer, the thickness of the heat resistant porous layer, the porosity of the heat resistant porous layer, the internal stress of the whole separator, or the like.

<Separator for Non-Aqueous Secondary Battery According to Second Embodiment>

A separator according to a second embodiment includes a porous substrate, a heat resistant porous layer that is provided on one side or both sides of the porous substrate, and an adhesive porous layer that is provided on both sides of a stacked body of the porous substrate and the heat resistant porous layer. The heat resistant porous layer includes a resin and a filler, satisfies the following expression (2), and includes an adhesive resin.

$$0.40 \leq Vf/CPVC \leq 0.99 \qquad \text{expression (2)}$$

In expression (2), Vf is the volume proportion (% by volume) of the filler in the heat resistant porous layer, and CPVC is the critical pigment volume concentration (% by volume) of the filler.

Since the separator according to the second embodiment includes a heat resistant porous layer, the separator has an excellent heat resistance. Since the separator according to the second embodiment includes adhesive porous layers on both sides thereof, the separator has an excellent adhesion to an electrode, resulting in excellent cycle characteristics. A battery to which the separator of the second embodiment is applied is less likely to catch fire even when a foreign matter is trapped in the battery.

In the separator according to the second embodiment, with regard to the filler contained in the heat resistant porous layer, the ratio Vf/CPVC of the volume proportion (% by volume) of the filler to the CPVC (critical pigment volume concentration) (% by volume) of the filler is from 0.40 to 0.99. When the Vf/CPVC is 0.40 or larger, the thermal shrinkage ratio of the heat resistant porous layer is low, and safety of the battery can be secured. From this point of view, the Vf/CPVC is preferably 0.45 or larger, and more preferably 0.50 or larger. On the other hand, when the Vf/CPVC is 0.99 or less, the filler is less likely to fall off from a heat resistant porous layer, and the heat resistant porous layer is less likely to be peeled off from the porous substrate. Accordingly, the heat resistance can be maintained. From this point of view, the Vf/CPVC is preferably 0.95 or less or less, and more preferably 0.90 or less.

The CPVC (critical pigment volume concentration) of the filler is a physical property obtained by measuring the linseed oil absorption amount per unit mass in accordance with JIS K-5101-13-1 (2004) and calculating using the following formula.

CPVC (% by volume) of filler=linseed oil absorption amount per unit mass (ml/g)×specific gravity (g/cm$^3$) of filler×100

The CPVC of the filler is a physical property determined by synthesizing factors such as the material properties, particle size, particle size distribution, shape and the like of the filler, and can be controlled by adjusting each of these factors. For example, the CPVC can be adjusted by pulverizing the filler or adding thereto an filler having a different particle size.

The volume proportion Vf of the filler in the heat resistant porous layer is calculated by the following formula.

volume proportion Vf (% by volume) of filler=volume per unit area (cm$^3$/m$^2$) of filler÷volume per unit area (cm$^3$/m$^2$) of heat resistant porous layer×100

The volume per unit area (cm$^3$/m$^2$) of the filler is determined by dividing the weight per unit area (g/m$^2$) of the filler by the specific gravity (g/cm$^3$) of the filler. The volume per unit area (cm$^3$/m$^2$) of the heat resistant porous layer is determined by the product of the thickness of the heat resistant porous layer and the unit area. The weight per unit area (g/m$^2$) of the filler may also be determined by the weight per unit area (basis weight, g/m$^2$) of the heat resistant porous layer and the composition of the heat resistant porous layer, or may be determined by TGA (thermogravimetric analysis).

The volume proportion Vf of the filler in the heat resistant porous layer can be controlled by the composition or porosity of the heat resistant porous layer.

Hereinafter, components of the separator according to the second embodiment, and ingredients contained in each of the components are described.

[Porous Substrate]

The porous substrate in the second embodiment has the same definition as the porous substrate in the first embodiment. Specific embodiments and preferable embodiments of the porous substrate in the second embodiment are the same as specific embodiments and preferable embodiments of the porous substrate in the first embodiment.

[Heat Resistant Porous Layer]

The separator according to the second embodiment includes a heat resistant porous layer on one side or both sides of the porous substrate. When the heat resistant porous layer is provided only on one side of the porous substrate, the thickness of the whole separator can be minimized, thereby contributing to improvement of the battery capacity, and favorable ion permeability can be easily obtained due to a small number of layers. On the other hand, when the heat resistant porous layer is provided on both sides of the porous substrate, the heat resistance of the separator is more excellent, and safety of a battery can be improved. When the heat resistant porous layer is provided on both sides of the porous substrate, a curl is less likely to be generated on the separator.

In the second embodiment, the heat resistant porous layer is a layer that includes a resin and a filler. The following embodiment A and embodiment B are preferable embodiments of the heat resistant porous layer.

Embodiment A

A heat resistant porous layer of embodiment A is a layer including a large number of micropores inside, and having a structure in which micropores communicate from one side to the other side, and is a layer through which gas or liquid can pass from one side to the other side. As embodiment A, an embodiment in which a resin has a fibril shape to form a three-dimensional network structure, by which a filler is trapped; and an embodiment in which a resin is attached to at least part of the surface of the filler to join the fillers with each other thereby forming a gap between the fillers when the content of the filler is relatively large, are preferable.

Embodiment B

A heat resistant porous layer of embodiment B is an aggregate of particulate resin (resin particles) and a filler (an inorganic filler is preferable). In other words, plural resin particles and plural filler particles are joined to form an aggregate in a layer form, and the aggregate is fixed on the surface of the porous substrate via at least part of the resin particles. The aggregate has a porous structure in a layer shape as a whole, and gas or liquid can pass from one side to the other side. Resin particles that are components of the aggregate are preferably joined with each other and with fillers. The resin particle retaining its particle shape can be confirmed by observing the surface of the heat resistant porous layer with an SEM (scanning electron microscope). Embodiment B is superior to embodiment A in the productivity of the separator.

—Resin—

As the resin, a resin that is stable with respect to an electrolyte, that is electrochemically stable, and that has a function of joining a filler is preferable.

When a material having a low heat resistance is used as a filler, a heat-resistant resin (a polymer having a melting point of 200° C. or higher or a polymer not having a melting point and having a decomposition temperature of 200° C. or higher) is preferably used. When a material whose heat resistance is excellent is used as a filler, a resin which is not heat resistant may be used, or a heat-resistant resin may be used, and from the viewpoint of improving the heat resistance of a separator, a heat-resistant resin preferably used.

Examples of the heat-resistant resin include a wholly aromatic polyamide, polyamide-imide, polyimide, polysulfone, polyethersulfone, polyketone, polyether ketone, polyether imide, cellulose, and polyvinyl alcohol. Among them, a wholly aromatic polyamide, polyamide-imide, polyimide, polyether imide, and polysulfone are preferable, from the viewpoint of excellent retention of an electrolyte.

Examples of resins other than heat-resistant resins include a polyvinylidene fluoride resin, polyolefin, polymethylpentene, and polyester Examples of a particulate resin (resin particle) include a particle including a resin such as a polyvinylidene fluoride resin, fluoro rubber, styrene-butadiene rubber, ethylene-acrylate copolymer, ethylene-acrylic acid copolymer, polyethylene, ethylene-vinyl acetate copolymer, and a cross-linked acrylic resin. Among them, a particle including a polyvinylidene fluoride resin is preferable from the viewpoint of excellent oxidation resistance.

Examples of a polyvinylidene fluoride resin as a component of the resin particle include homopolymers of vinylidene fluoride (polyvinylidene fluoride), and copolymers of vinylidene fluoride and another monomer (polyvinylidene fluoride copolymer), a mixture of polyvinylidene fluoride and an acrylic polymer, and a mixture of a polyvinylidene fluoride copolymer and an acrylic polymer.

Examples of the monomer that is copolymerizable with vinylidene fluoride include vinyl fluoride, chlorotrifluoroethylene, tetrafluoroethylene, hexafluoropropylene, trifluoroethylene, trichloroethylene, trifluoroperfluoropropylether, ethylene, (meth)acrylic acid, methyl (meth)acrylate, (meth)acrylic acid ester, vinyl acetate, vinyl chloride, and acrylonitrile. One of these monomers may be used singly or two or more thereof may be used in combination.

The weight-average molecular weight of each of polyvinylidene fluoride and a polyvinylidene fluoride copolymer as a component of the resin particle is preferably from 1,000 to 5,000,000, more preferably from 10,000 to 2,000,000, and further preferably from 50,000 to 1,000,000. Each of polyvinylidene fluoride and a polyvinylidene fluoride copolymer can be synthesized by emulsion polymerization or suspension polymerization.

Examples of acrylic polymer as a component of the resin particle include a poly(meth)acrylic acid, a poly(meth)acrylate, a poly(meth)acrylic acid ester, a cross-linked poly(meth)acrylic acid, a cross-linked poly(meth)acrylate, and a cross-linked poly(meth)acrylic acid ester, and a modified acrylic polymer may be used. One of these acrylic polymers may be used singly or two or more thereof may be used in combination.

As a resin that is a component of the resin particle, it is preferable to use polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, or a mixture of a polyvinylidene fluoride copolymer and an acrylic polymer. From the viewpoint of obtaining mechanical strength with which a battery can withstand an applied pressure or heat during its manufacture, the polyvinylidene fluoride copolymer is preferably a copolymer that includes structural units derived from vinylidene fluoride in an amount of 50 mole % or more.

From the viewpoint of oxidation resistance, each of the mixture of polyvinylidene fluoride and an acrylic polymer and the mixture of a polyvinylidene fluoride copolymer and an acrylic polymer as components of the resin particle preferably includes polyvinylidene fluoride or a polyvinylidene fluoride copolymer in an amount of 20% by mass or more.

From the viewpoint of handling properties or manufacturability, the volume average particle diameter of the resin particle is preferably from 0.01 µm to 1 µm, more preferably from 0.02 µm to 1 µm, and further preferably from 0.05 µm to 1 µm.

The content of the resin in the heat resistant porous layer is preferably from 1% by mass to 50% by mass. When the content of the resin is 1% by mass or more, a filler is less likely to fall off from the heat resistant porous layer, and the heat resistant porous layer is less likely to be peeled off from the porous substrate, and the adhesive porous layer is less likely to be peeled off from the heat resistant porous layer. From this point of view, the content of the resin is more preferably 2% by mass or more, further preferably 3% by mass or more. On the other hand, when the content of the resin is 50% by mass or less, the thermal dimensional stability and ion permeability of the separator are more excellent. From this point of view, the content of the resin is more preferably 40% by mass or less, and further preferably 30% by mass or less.

—Filler—

As the filler, a filler that is stable with respect to an electrolyte and that is electrochemically stable is preferable. The filler may be either an organic filler or an inorganic filler. The filler may be used singly or in combination of two or more thereof.

Examples of the organic filler include crosslinked polymer particles of a crosslinked poly(meth)acrylic acid, a crosslinked poly(meth)acrylic acid ester, a crosslinked polysilicone, a crosslinked polystyrene, a crosslinked polydivinylbenzene, a crosslinked product of a styrene-divinylbenzene copolymer, polyimide, a melamine resin, a phenol resin, a benzoguanamine-formaldehyde condensate, or the like; and heat resistant polymer particles of polysulfone, polyacrylonitrile, aramide, polyacetal, thermoplastic polyimide, or the like. Among them, a crosslinked poly(meth)acrylic acid, a crosslinked poly(meth)acrylic acid ester, and a crosslinked polysilicone are preferable.

Examples of the inorganic filler include metal hydroxides such as aluminium hydroxide, magnesium hydroxide, calcium hydroxide, chromium hydroxide, zirconium hydroxide, cerium hydroxide, nickel hydroxide, or boron hydroxide; metal oxides such as alumina or zirconia; carbonates such as calcium carbonate or magnesium carbonate; sulfates such as barium sulfate or calcium sulfate; and clay minerals such as calcium silicate or talc. Among them, metal hydroxides or metal oxides are preferable, and from the viewpoint of imparting flame resistance or an effect of electricity removal, metal hydroxides and metal oxides are preferable, and magnesium hydroxide is particularly preferable. An inorganic filler that is surface-modified with a silane coupling agent or the like can also be used.

The CPVC of the filler is preferably from 20% by volume to 80% by volume. When the CPVC of the filler is 80% by volume or less, pores are less likely to be occluded at the interface of a heat resistant porous layer and an adhesive porous layer, and the separator has more favorable ion permeability. When the CPVC of the filler is 80% by volume or less, the thermal shrinkage ratio of the heat resistant porous layer can be minimized even when the amount of filler added is small, and the safety of a battery can be secured. Further, when the CPVC of the filler is 80% by volume or less, the filler is less likely to fall off from the heat resistant porous layer. From these points of view, the CPVC of the filler is more preferably 75% by volume or less, further preferably 70% by volume or less, and still further preferably 60% by volume or less. On the other hand, when the CPVC of the filler is 20% by volume or more, the coating liquid has favorable coating properties in cases in which the heat resistant porous layer is formed by wet coating, and, therefore, occurrence of defects such as coating lines is suppressed. From this point of view, the CPVC of the filler is more preferably 25% by volume or more, further preferably 40% by volume or more, and still further preferably 43% by volume or more.

The volume average particle diameter of the filler is preferably from 0.01 µm to 10 µm. The lower limit thereof is more preferably 0.1 µm, and the upper limit thereof is more preferably 5 µm.

The particle size distribution of the filler is preferably 0.1 µm<d90−d10<3 µm. Here, the d10 represents the particle diameter (µm) to which the cumulative total of the particles in the particle size distribution from the smaller particle size side is 10% by mass, and the d90 represents the particle diameter (µm) to which the cumulative total of the particles in the particle size distribution from the smaller particle size side is 10% by mass. The particle size distribution measurement is performed, for example, by using a laser diffraction particle size analyzer, by using water as a dispersion medium, and by using as needed a nonionic surfactant (for example, Triton X-100) as a dispersant.

The particle shape of the filler may be any shape, and may be spherical, elliptical, plate-shaped, rod-shaped, or irregular. From the viewpoint of preventing a short circuit of a battery, the inorganic filler is preferably a plate-shaped particle or a primary particle that is not aggregated.

The content of the filler in the heat resistant porous layer is preferably from 2.0 g/m$^2$ to 20.0 g/m$^2$. When the content of the filler is 2.0 g/m$^2$ or more, the heat resistance of the separator is more excellent. From this point of view, the content of the filler is more preferably 2.5 g/m$^2$ or more, and further preferably 3.0 g/m$^2$ or more. On the other hand, when the content of the filler is 20.0 g/m$^2$ or less, the heat resistant porous layer is less likely to be peeled off from the porous substrate. From this point of view, the content of the filler is more preferably 15.0 g/m$^2$ or less, and further preferably 12.0 g/m$^2$ or less.

In the heat resistant porous layer, the filler preferably accounts for from 50% by mass to 98% by mass of the total amount of the resin and the filler. When the proportion of the filler is 50% by mass or more, the thermal dimensional stability and ion permeability of the separator are excellent. From this point of view, the proportion of the filler is more preferably 60% by mass or more, further preferably 65% by mass or more, still further preferably 70% by mass or more, still further preferably 80% by mass or more, and still further preferably 85% by mass or more. On the other hand, when the proportion of the filler is 98% by mass or less, the filler is less likely to fall off from the heat resistant porous layer, and the heat resistant porous layer is less likely to be peeled off from the porous substrate, and the adhesive porous layer is less likely to be peeled off from the heat resistant porous layer. From this point of view, the proportion of the filler is more preferably 97.5% by mass or less, further preferably 97% by mass or less, still further preferably 95% by mass or less, and still further preferably 90% by mass or less.

—Thickener—

The heat resistant porous layer may include a thickener. In the heat resistant porous layer that is formed of a coating liquid including a thickener, unevennness of the resin and the filler is suppressed.

Example of the thickener include resins such as cellulose, polyvinyl alcohol, polyvinyl butyral, polyvinyl pyrrolidone, polyethylene glycol, polypropylene glycol, polyacrylic acid, higher alcohols, and salts thereof. Among them, cellulose and a cellulose salts are preferable. For example, carboxymethylcellulose, hydroxyethylcellulose, hydroxypropylcellulose, methylcellulose, and sodium salts or ammonium salts thereof are preferable.

From the viewpoint of the thermal dimensional stability, moisture content, and ion permeability of the separator, the proportion of the thickener with respect to the total amount of the resin, the filler, and the thickener is preferably 10% by mass or less, more preferably 5% by mass or less, and further preferably 3% by mass or less. From the viewpoint of inhibiting unevennness of the resin and the filler in the heat resistant porous layer to improve ion permeability, the proportion of the thickener with respect to the total amount of the resin, the filler, and the thickener is preferably 0.1% by mass or more, more preferably 0.3% by mass or more, and further preferably 0.5% by mass or more.

—Other Ingredients—

The heat resistant porous layer may include ingredients other than the above-mentioned compounds without inhibiting the effect of the present invention. Examples of the ingredients include a dispersant, a wetting agent, an antifoaming agent, and a pH adjusting agent which can be added to a coating liquid for forming the heat resistant porous layer. It is noted that the resin and the filler preferably account for 90% by mass or more of the total amount of the heat resistant porous layer.

[Method of Forming Heat Resistant Porous Layer]

A method of forming the heat resistant porous layer on the porous substrate is not particularly limited. The heat resistant porous layer can be formed by, for example, the following method 1 or method 2.

—Method 1—

Method 1 is a method for forming a heat resistant porous layer of embodiment A. Method 1 includes the following process A1 to process A5.

Process A1: Process of Manufacturing Slurry

A resin is dissolved in a solvent, and a filler is dispersed therein to manufacture a slurry for forming a heat resistant porous layer. The solvent is not particularly limited as long as the solvent dissolves a resin. As the solvent, a polar solvent is preferable, and example of the polar solvent include dimethyl sulfoxide, N,N-dimethylformamide, N,N-dimethylacetamide, and N-methyl-2-pyrrolidone. A solvent that is a poor solenon-poler solvent with respect to the resin can be added in addition to the polar solvent. Application of a poor solvent induces a micro phase separation structure and facilitates making the heat resistant porous layer porous. As the poor solvent, alcohols are preferred, and polyhydric alcohols such as glycol are particularly preferable. The concentration of the resin in the slurry is preferably from 4% by mass to 9% by mass. In cases in which an inorganic filler is used as the filler, when the dispersibility of the inorganic filler is not preferable, the inorganic filler may be subjected to a surface treatment with a silane coupling agent or the like, thereby improving the dispersibility.

The slurry may include a thickener for the purpose of adjusting the viscosity to a value appropriate for coating on a porous substrate. The slurry may include a dispersant such as a surfactant for the purpose of enhancing the dispersibilities of the filler. The slurry may include a wetting agent for the purpose of improving the conformity with a porous substrate. The slurry may also include an antifoaming agent or a pH adjusting agent. Such additives may remain in a battery as long as the additives are electrochemically stable under circumstances in which the battery is used and as long as the additives do not inhibit a reaction in the battery.

Process A2: Coating Process

The slurry is coated on one side or both sides of the porous substrate. When the heat resistant porous layer is formed on both sides of the porous substrate, simultaneous coating on both sides of the substrate is preferable from the viewpoint of reduction of the process. Examples of the method of coating the slurry include a knife coater method, a gravure coater method, a meyer-bar method, a die coater method, a reverse roll coater method, a roll coater method, a screen printing method, an ink-jet method, and a spraying method. Among them, a reverse roll coater method is preferable from the viewpoint of forming a coating layer uniformly.

Process A3: Coagulation Process

A heat resistant porous layer is formed by coagulating the resin by treating the slurry coated on the porous substrate with a coagulating liquid. Examples of the treatment method using a coagulation liquid include: a method of spraying a coagulating liquid on a surface on which the slurry has been coated; and a method of immersing a porous substrate on which a slurry has been coated in a bath (coagulation bath) containing a coagulating liquid. The coagulating liquid may be a liquid which can coagulate the resin, and is preferably water, or a liquid obtained by adding water to the solvent which is used for the slurry. The mixing amount of water in the coagulation bath is preferably from 40% by mass to 80% by mass from the viewpoint of the coagulation efficiency or from the viewpoint of making a heat resistant porous layer porous.

Process A4: Water Washing Process

The coagulating liquid in the coating layer is removed by washing the coating layer after coagulation with water.

Process A5: Drying Process

The coating layer after washing is dried to remove water. A drying method is not particularly limited. The drying temperature is preferably from 50° C. to 80° C., and when a high drying temperature is applied, a method of contacting a roll is preferably applied in order not to cause a dimensional change due to thermal shrinkage.

—Method 2—

Method 2 is a method for forming a heat resistant porous layer of embodiment B. Method 2 includes the following process B1 to process B3.

Process B1: Manufacturing Process of Slurry

A slurry for forming a heat resistant porous layer is prepared by dispersing, suspending, or emulsifying resin particles and a filler in a solvent. As the solvent, at least water is used, and further, a solvent other than water may be added. The solvent other than water is not particularly limited as long as the solvent does not dissolve the resin particles and is capable of dispersing or suspending the resin particles in the solid state or emulsifying the resin particles. Examples thereof include organic solvents such as methanol, ethanol, 2-propanol, acetone, tetrahydrofuran, methyl ethyl ketone, ethyl acetate, N-methylpyrrolidone, dimethylacetamide, dimethylformamide, or dimethylformamide. From the viewpoints of low load to the environment, safety, and economy, it is preferable to use a water-based emulsion obtained by emulsifying the resin particles and the inorganic filler in water or in a mixed liquid of water and alcohol.

The slurry may include a thickener for the purpose of adjusting the viscosity to a value appropriate for coating on a porous substrate. The slurry may include a dispersant such as a surfactant for the purpose of enhancing the dispersibilities of the resin particles and filler. The slurry may include a wetting agent for the purpose of improving the conformity with a porous substrate. The slurry may also include an antifoaming agent or a pH adjusting agent. Such additives may remain in a battery as long as the additives are electrochemically stable under circumstances in which the battery is used and as long as the additives do not inhibit a reaction in the battery.

The content of the resin particles in the slurry is preferably from 1% by mass to 25% by mass. The content of the filler in the slurry is preferably from 2% by mass to 50% by mass.

Process B2: Coating Process

In process B2, a process same as process A2 may be employed.

Process B3: Drying Process

By drying the slurry on the porous substrate, the solvent is removed, and the resin particle functions as a binder, whereby the coating layer including the resin particles and the filler is fixed to the porous substrate.

Each of method 1 and method 2 is a method in which a heat resistant porous layer is directly formed on a porous substrate by a wet coating method. Alternatively, a heat resistant porous layer can be formed on a porous substrate by a method of bonding a sheet of a heat resistant porous layer which is separately manufactured on a porous substrate using adhesives or the like or also by a method of heat sealing or compression bonding.

[Characteristics of Heat Resistant Porous Layer]

From the viewpoint of heat resistance and handling properties, the thickness of the heat resistant porous layer is preferably 0.5 μm or more per one side, and more preferably 1 μm or more per one side, and from the viewpoint of handling properties and battery capacity, the thickness of the heat resistant porous layer is preferably 5 μm or less per one side. Both in cases in which a heat resistant porous layer is provided on one side of a porous substrate and in cases in which heat resistant porous layer is provided on both sides of a porous substrate, the lower limit of the sum of the thicknesses is preferably 1 μm, more preferably 2 μm, and further preferably 3 μm, and the upper limit thereof is preferably 10 μm, more preferably 8 μm, and further preferably 5 μm.

The porosity of the heat resistant porous layer is preferably from 40% to 70%. When the porosity of the heat resistant porous layer is 40% or more, ion permeability of the separator is more excellent. From this point of view, the porosity is more preferably 45% or more, further preferably 50% or more, and still further preferably 55% or more. On the other hand, when the porosity of the heat resistant porous layer is 70% or less, the thermal dimensional stability of the separator is more excellent. From this point of view, the porosity is more preferably 68% or less, and further preferably 65% or less.

[Adhesive Porous Layer]

In the second embodiment, an adhesive porous layers is provided on both sides of the separator as the outermost layer, and the adhesive porous layer is a layer which includes an adhesive resin and which can bond to an electrode. Since the separator according to the second embodiment includes the adhesive porous layers on both sides of the separator, the separator has an excellent adhesion to both electrodes of a battery. Since the separator according to the second embodiment includes the adhesive porous layers on both sides of the separator, a battery has excellent cycle characteristics (capacity retention rate) compared with cases in which a separator includes the layer on one side.

Preferable embodiments of the adhesive porous layer are the following embodiment A' and embodiment B'.

Embodiment A'

An adhesive porous layer of embodiment A' is a layer including a large number of micropores inside, and having a structure in which micropores communicate from one side to the other side, and is a layer through which gas or liquid can pass from one side to the other side. As embodiment A', an embodiment in which a resin has a fibril shape to form a three-dimensional network structure is preferable, and when a filler is contained, an embodiment in which a filler is trapped by the network structure is preferable.

Embodiment B'

A adhesive porous layer of embodiment B' is an aggregate of particulate resin (resin particles). In other words, plural resin particles are joined to form a layered aggregate, and the aggregate is fixed on the surface of the porous substrate or heat resistant porous layer via at least part of the resin particles. The aggregate has a porous structure in a layer shape as a whole, and gas or liquid can pass from one side to the other side. When a filler is contained, an embodiment in which a resin particle is joined with a filler to form an aggregate is preferable.

—Adhesive Resin—

An adhesive resin contained in the adhesive porous layer is not particularly limited as long as the adhesive resin is capable of bonding to an electrode. For example, polyvinylidene fluoride resins such as polyvinylidene fluoride and a polyvinylidene fluoride copolymer; fluoro rubber; a styrene-butadiene copolymer; a homopolymer or copolymer of vinyl nitriles such as acrylonitrile and methacrylonitrile; cellulose such as carboxymethylcellulose and hydroxyalkyl cellulose; polyvinyl compounds such as polyvinyl alcohol, polyvinyl butyral, and polyvinyl pyrrolidone; and polyethers such as polyethylene oxide and polypropylene oxide are preferable. Among them, polyvinylidene fluoride resins are preferable. The adhesive porous layer may contain one adhesive resin or may contain two or more adhesive resins.

Examples of the polyvinylidene fluoride resins include homopolymer of vinylidene fluoride (polyvinylidene fluoride), copolymer of vinylidene fluoride and another monomer (polyvinylidene fluoride copolymer), and a mixture thereof. Examples of the vinylidene fluoride and copolymerizable monomer include hexafluoropropylene, tetrafluoroethylene, trifluoroethylene, trichloroethylene, and vinyl fluoride, and one or two or more thereof can be used. Polyvinylidene fluoride resins can be synthesized by emulsion polymerization or suspension polymerization.

The polyvinylidene fluoride resin preferably contains vinylidene fluoride as a structural unit in an amount of 95 mole % or more (more preferably 98 mole % or more). When vinylidene fluoride is contained in an amount of 95 mole % or more, mechanical strength and heat resistance with which a battery can withstand an applied pressure or heat during its manufacture can be easily secured.

As the polyvinylidene fluoride resin, from the viewpoint of adhesion to an electrode, a copolymer of vinylidene fluoride and hexafluoropropylene is preferable, and a copolymer including from 0.1 mole % to 5 mole % (preferably 0.5 mole % to 2 mole %) of structural units derived from hexafluoropropylene is more preferable.

The weight-average molecular weight of the adhesive resin (in particular, polyvinylidene fluoride resin) is preferably from 300,000 to 3,000,000. When the weight-average molecular weight is 300,000 or more, mechanical characteristics with which the adhesive porous layer can withstand the adhesion treatment with an electrode can be secured, thereby obtaining sufficient adhesion. On the other hand, when the weight-average molecular weight is 3,000,000 or less, the viscosity of a coating liquid which is used during coat molding does not become too high, favorable moldability and crystal formation are obtained, and an adhesive porous layer that is favorably porous is obtained. The weight-average molecular weight is more preferably from 300,000 to 2,000,000, further preferably from 500,000 to 1,500,000, and particularly preferably from 600,000 to 1,000,000.

Examples of a particulate resin (resin particle) include a particle including a resin such as a polyvinylidene fluoride resin, fluoro rubber, styrene-butadiene rubber, ethylene-acrylate copolymer, ethylene-acrylic acid copolymer, polyethylene, ethylene-vinyl acetate copolymer, and a cross-linked acrylic resin. Among them, a particle including a polyvinylidene fluoride resin is preferable from the viewpoint of excellent oxidation resistance.

Examples of a polyvinylidene fluoride resin as a component of the resin particle include homopolymers of vinylidene fluoride (polyvinylidene fluoride), copolymers of vinylidene fluoride and another monomer (polyvinylidene fluoride copolymer), a mixture of polyvinylidene fluoride and an acrylic polymer, and a mixture of a polyvinylidene fluoride copolymer and an acrylic polymer.

Examples of the monomer that is copolymerizable with vinylidene fluoride include vinyl fluoride, chlorotrifluoroethylene, tetrafluoroethylene, hexafluoropropylene, trifluoroethylene, trichloroethylene, trifluoroperfluoropropylether, ethylene, (meth)acrylic acid, methyl (meth)acrylate, (meth)acrylic acid ester, vinyl acetate, vinyl chloride, and acrylonitrile. One of these monomer may be used singly or two or more thereof may be used in combination.

The weight-average molecular weight of each of polyvinylidene fluoride and a polyvinylidene fluoride copolymer as a component of the resin particle are preferably from 1,000 to 5,000,000, more preferably from 10,000 to 2,000,000, and further preferably from 50,000 to 1,000,000. Each of Polyvinylidene fluoride and a polyvinylidene fluoride copolymer can be synthesized by emulsion polymerization or suspension polymerization.

Examples of acrylic polymer as a component of the resin particle include a poly(meth)acrylic acid, a poly(meth)acrylic acid salt, a poly(meth)acrylic acid ester, a cross-linked poly(meth)acrylic acid, a cross-linked poly(meth)acrylic acid salt, and a cross-linked poly(meth)acrylic acid ester, and a modified acrylic polymer may be used. One of these acrylic polymers may be used singly or two or more thereof may be used in combination.

As a resin that is a component of the resin particle, it is preferable to use polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, or a mixture of a polyvinylidene fluoride copolymer and an acrylic polymer. From the viewpoint of obtaining mechanical strength with which a battery can withstand an applied pressure or heat during its manufacture, the polyvinylidene fluoride copolymer is preferably a copolymer that includes structural units derived from vinylidene fluoride in an amount of 50 mole % or more.

From the viewpoint of oxidation resistance, each of the mixture of polyvinylidene fluoride and an acrylic polymer and the mixture of a polyvinylidene fluoride copolymer and an acrylic polymer, as a component of the resin particle, preferably include polyvinylidene fluoride or a polyvinylidene fluoride copolymer in an amount of 20% by mass or more.

From the viewpoint of handling properties or manufacturability, the volume average particle diameter of the resin particles is preferably from 0.01 µm to 1 µm, more preferably from 0.02 µm to 1 µm, and further preferably from 0.05 µm to 1 µm.

—Filler—

The adhesive porous layer may include a filler. As the filler, a filler that is stable with respect to an electrolyte, that is electrochemically stable, and that has a function of joining an inorganic filler is preferable. The filler may be either an organic filler or an inorganic filler, and specific examples thereof include the fillers described as examples of the filler contained in a heat resistant porous layer illustrated above. The filler may be used singly or in combination of two or more thereof.

When the adhesive porous layer includes a filler, the proportion of the filler with respect to the total amount of the resin and the filler is preferably from 1% by mass to 30% by mass.

[Method of Forming Adhesive Porous Layer]

A method of forming an adhesive porous layer is not particularly limited. An adhesive porous layer can be formed by a method similar to method 1 or method 2 of forming a heat resistant porous layer.

[Characteristics of Adhesive Porous Layer]

From the viewpoint of adhesion to an electrode and ion permeability, the thickness of the adhesive porous layer per one side is preferably from 0.5 µm to 10 µm, and more preferably from 1 µm to 5 µm.

From the viewpoint of adhesion to an electrode and ion permeability, the coating amount of the adhesive porous layer is preferably from 0.5 g/m$^2$ to 3.5 g/m$^2$ in total on both sides.

From the viewpoint of ion permeability, the adhesive porous layer preferably has a structure which is sufficiently porous, and the porosity is preferably from 30% to 70%. When the porosity is 70% or less, mechanical strength with which the adhesive porous layer can withstand an applied pressure or heat during battery manufacture can be secured. When the porosity is 70% or less, the surface aperture ratio is not too high, and favorable adhesion to an electrode is attained. From these points of view, the porosity is more preferably 60% or less. On the other hand, when the porosity is 30% is 30% or more, favorable ion permeability is attained. From this point of view, the porosity is more preferably 35% or more, further preferably 40% or more, and further preferably 45% or more.

The peel strength between the heat resistant porous layer and the adhesive porous layer is preferably 0.05 N/cm or more, more preferably 0.06 N/cm or more, and further preferably 0.07 N/cm or more.

[Characteristics of Separator According to Second Embodiment]

From the viewpoint of mechanical strength and energy density of a battery, the thickness of the separator according to the second embodiment is preferably from 5 µm to 35 µm, more preferably from 5 µm to 30 µm, and further preferably from 10 µm to 25 µm.

From the viewpoint of mechanical strength, handling properties, and ion permeability, the porosity of the separator according to the second embodiment is preferably from 30% to 60%.

From the viewpoint of obtaining favorable ion permeability, the average of the porosity of the heat resistant porous layer and the porosity of the adhesive porous layer of the separator according to the second embodiment is preferably from 30% to 70%. The lower limit thereof is more preferably 35%, further preferably 40%, and further preferably 45%, and the upper limit is more preferably 65%, and further preferably 60%.

The average of the porosity of the heat resistant porous layer and the porosity of the adhesive porous layer is calculated by the following formula. In the formula below, each of the thickness of the heat resistant porous layer and the thickness of the adhesive porous layer is the total value of both sides thereof.

average porosity (%)={porosity (%) of heat resistant porous layer×thickness (µm) of heat resistant porous layer+porosity (%) of adhesive porous layer×thickness (µm) of adhesive porous layer}÷{thickness (µm) of heat resistant porous layer+thickness (µm) of adhesive porous layer}

In view of good balance between the mechanical strength and the ion permeability, the Gurley value (JIS P8117 (2009)) of the separator according to the second embodiment is preferably from 50 sec/100 cc to 800 sec/100 cc, more preferably from 100 sec/100 cc to 500 sec/100 cc, and further preferably from 100 sec/100 cc to 400 sec/100 cc.

From the viewpoint of ion permeability, the tortuosity of the separator according to the second embodiment is preferably 1.5 to 2.5.

From the viewpoint of short circuit prevention, mechanical strength, and handling properties, the piercing strength of the separator according to the second embodiment is preferably from 250 g to 1000 g, more preferably from 300 g to 1000 g, and further preferably from 300 g to 600 g.

From the viewpoint of short circuit prevention, mechanical strength, and handling properties, the tensile strength of the separator according to the second embodiment is preferably 10 N or more.

From the viewpoint of the load characteristic of a battery, the film resistance of the separator according to the second embodiment is preferably from 0.5 ohm·cm² to 10 ohm·cm², and more preferably from 1 ohm·cm² to 8 ohm·cm².

The shutdown temperature of the separator according to the second embodiment is preferably from 130° C. to 155° C. when a porous substrate formed of a polyolefin is used.

In a case in which the separator according to the second embodiment is subjected to a heat treatment at 150° C. for 30 minutes, the thermal shrinkage ratio of the separator according to the second embodiment in the MD direction is preferably 20% or less, and more preferably 10% or less, and the thermal shrinkage ratio of the separator according to the second embodiment in the TD direction is preferably 10% or less, and more preferably 5% or less. When the thermal shrinkage ratio is in this range, the shape stability of a separator is high, and, therefore, it is possible to provide a battery in which a short circuit is less likely to occur even when exposed to high temperatures.

In a case in which the separator according to the second embodiment is subjected to a heat treatment at 130° C. for 30 minutes, the thermal shrinkage ratio of the separator according to the second embodiment in the MD direction is preferably 10% or less, and more preferably 8% or less, and the thermal shrinkage ratio of the separator according to the second embodiment in the TD direction is preferable 5% or less, and more preferably 3% or less. When the thermal shrinkage ratio is in this range, the shape stability of a separator is high, and, therefore, it is possible to provide a battery in which a short circuit is less likely to occur even when exposed to high temperatures.

In a case in which the separator according to the second embodiment is heated at a rate of temperature increase of 5° C./min. to the flow elongation deformation temperature of the thermoplastic resin, the thermal dimensional change ratio of the separator according to the second embodiment in the MD direction is preferably 3% or less, and more preferably 2% or less. When the thermal dimensional change ratio in the MD direction is in this range, a thermal strain in the MD direction of the separator is small in a battery manufactured by winding a separator and an electrode in the longitudinal direction, and, therefore, it is possible to provide a battery having a high heat resistance.

In a case in which the separator according to the second embodiment is heated at a rate of temperature increase of 5° C./min. to the flow elongation deformation temperature of the thermoplastic resin, the thermal dimensional change ratio of the separator according to the second embodiment in the TD direction is preferably 3% or less, and more preferably 2% or less. When the thermal dimensional change ratio in the TD direction is in this range, the thermal strain of the separator in the TD direction is small in a battery (cylindrical type battery, square type battery, laminate battery, or the like) manufactured by stacking a separator and an electrode together, and, therefore, it is possible to provide a battery having a high heat resistance. The width of the separator does not need to be adjusted anticipating a thermal deformation of the separator in the TD direction, thereby also contributing to the improvement of the battery capacity.

Specifically, the above-described thermal dimensional change ratio is a temperature determined by the following method. A separator is cut into a 3 mm (TD direction)×16 mm (MD direction) piece and a 3 mm (MD direction)×16 mm (TD direction) piece. A sample is placed into a TMA measurement device, a TMA (thermomechanical analysis) is performed under the conditions such that the temperature-rising rate is 5° C./min. and the target temperature is the flow elongation deformation temperature of thermoplastic resin, while applying a load of 19.6 mN in the longitudinal direction of the sample, and a TMA chart is prepared by plotting the temperature along the horizontal axis and the sample length along the vertical axis for each of the MD direction and the TD direction. From the TMA chart, the maximum change amount of the separator is extracted, and the absolute value of the maximum change amount is defined as a maximum deformation amount, and the thermal dimensional change ratio is calculated by the following formula.

thermal dimensional change ratio (%) in MD direction=(maximum deformation amount in MD direction)/(length in MD direction before heating)×100 thermal dimensional change ratio (%) in TD direction=(maximum deformation amount in TD direction)/((length in TD direction before heating)×100

The thermal shrinkage ratio and thermal dimensional change ratio of the separator according to the second embodiment can be controlled by, for example, the content of the filler in the heat resistant porous layer, the thickness of the heat resistant porous layer, the thickness of the heat resistant porous layer, the average of the porosity of the heat resistant porous layer and the porocity of the adhesive porous layer, the internal stress of the whole separator, or the like.

<Non-Aqueous Secondary Battery>

The non-aqueous secondary battery of the present invention is a non-aqueous secondary battery in which electromotive force is obtained by lithium doping/dedoping, and which includes a positive electrode, a negative electrode, and a separator for a non-aqueous secondary battery of the present invention. A non-aqueous secondary battery has a structure in which a battery element in which a construct in which a negative electrode and a positive electrode are faced to each other via a separator is impregnated with an electrolyte is enclosed in an outer casing member. The term "dope" means occlusion, support, adsorption, or insertion, and means a phenomenon in which a lithium ion enters into an active material of an electrode.

The non-aqueous secondary battery of the present invention is excellent in battery characteristics and safety when at least one of the separator of the first embodiment and the separator of the second embodiment is applied.

In the non-aqueous secondary battery of the present invention, when the separator of the first embodiment is applied, it is preferable from the viewpoint of the durability of a battery that a heat resistant porous layer of the separator includes olyvinylidene fluoride resin particles and the separator is disposed such that the heat resistant porous layer is in contact with a positive electrode. In general, oxidizing atmosphere of a positive electrode has an influence on the durability of a non-aqueous secondary battery; however, since a polyvinylidene fluoride resin has a high oxygen index and a high oxidation resistance, the surface of a separator is less likely to be oxidized or carbonized when a heat resistant porous layer including the resin is disposed so as to be in contact with a positive electrode, and then the battery has favorable durability.

In the non-aqueous secondary battery of the present invention, when the separator of the second embodiment is applied, it is preferable from the viewpoint of the durability of a battery that an adhesive porous layer of the separator includes a polyvinylidene fluoride resin. In general, oxidizing atmosphere of a positive electrode has an influence on the durability of a non-aqueous secondary battery; however, since a polyvinylidene fluoride resin has a high oxygen index and a high oxidation resistance, the surface of a separator is less likely to be oxidized or carbonized when the adhesive porous layer include the resin, and then the battery has favorable durability.

The non-aqueous secondary battery of the present invention is suitable for non-aqueous electrolyte secondary batteries, in particular for lithium ion secondary batteries.

[Positive Electrode]

The positive electrode may have a structure in which an active material layer including a positive electrode active material and a binder resin is formed on a current collector. The active material layer may further include an electrically conductive additive.

Examples of the positive electrode active material include lithium-containing transition metal oxides, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

A positive electrode active material which can be operated at a high voltage of 4.2 V or more, such as $LiMn_{1/2}Ni_{1/2}O_2$ or $LiCo_{1/3}Mn_{1/3}Ni_{1/3}O_2$, is desirably in combination with a separator including a polyvinylidene fluoride resin in a layer which is in contact with a positive electrode.

Examples of the binder resin include a polyvinylidene fluoride resin.

Examples of the electrically conductive additive include a carbon material such as acetylene black, Ketjen black, or graphite powder.

Examples of the current collector include aluminum foil, titanium foil, and stainless foil having a thickness of from 5 μm to 20 μm.

[Negative Electrode]

The negative electrode may have a structure in which an active material layer containing a negative electrode active material and a binder resin is formed on a current collector. The active material layer may further contain an electrically conductive additive.

Examples of the negative electrode active material include materials capable of electrochemically occluding lithium. Specific examples include carbon materials, and alloys of lithium and silicon, tin, aluminium, or the like.

Examples of the binder resin include polyvinylidene fluoride resins and styrene-butadiene rubbers.

Examples of the electrically conductive additive include carbon materials such as acetylene black, Ketjen black, or graphite powder.

Examples of the current collector include a copper foil, a nickel foil, and a stainless steel foil, each having a thickness of from 5 μm to 20 μm.

Instead of using the negative electrode described above, a metal lithium foil may be used as the negative electrode.

[Electrolyte]

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and the like. These non-aqueous solvents may be used singly or in mixture.

As the electrolyte, a solution is preferred, which is obtained by mixing a cyclic carbonate and a chain carbonate at a mass ratio (cyclic carbonate/chain carbonate) of from 20/80 to 40/60, and dissolving a lithium salt to give a concentration of from 0.5 M to 1.5 M.

[Manufacture Method of Non-Aqueous Secondary Battery]

The non-aqueous secondary battery of the invention can be manufactured, for example, by a method in which a stacked body in which the separator of the invention is disposed between a positive electrode and a negative electrode is impregnated with an electrolyte, and housed in an outer casing member, and the stacked body is pressed from above the outer casing member.

A system of disposing a separator between a positive electrode and a negative electrode may be a system of stacking a positive electrode, a separator, and a negative electrode on one another, each by at least one layer, in this order (a so-called stack system) or may be a system in which a positive electrode, a separator, a negative electrode, and a separator are stacked together in the order mentioned and wound in the length direction.

Examples of the outer casing member include a metal can and an aluminum laminated film pack.

Since adhesion to electrodes is suitable when a separator having an outermost surface layer containing a polyvinylidene fluoride resin, a space is hardly formed between the electrode and the separator, even if impact from the outside is applied or expansion/shrinkage of the electrode occurs during charging and discharging. Thus, the separator of the invention is suitable for use in an aluminum laminated film pack as the outer casing material.

Examples of the shape of a battery include a square type, a cylindrical type, and a coin type. The separator of the invention is suitable for any shape.

EXAMPLES

Hereinafter, the present invention is described in further detail with reference to Examples. The Material, amount of use, proportion, procedure, or the like described below can be appropriately modified without deviating from the spirit of the present invention. Therefore, the scope of the present invention should not be construed to be limited by the following specific examples.

<Measurement Method>

The following measurement methods were applied in the Examples of the present invention and the Comparative Examples.

[Weight-Average Molecular Weight of Resin]

The weight-average molecular weight of the resin was determined by gel permeation chromatography (GPC).

Device: Gel permeation chromatograph ALLIANCE GPC2000 type (manufactured by Waters)

Column: TSKgel GMH6-HT×2, TSKgel GMH6-HTL×2 (manufactured by Tosoh Corporation)

Column Temperature: 140° C.

Mobile Phase: o-dichlorobenzene

Column Temperature: 140° C.

Reference Material for Molecular Weight Calibration: Monodisperse Polystyrene (manufactured by Tosoh Corporation)

[Composition of Polyvinylidene Fluoride Resin]

20 mg of a polyvinylidene fluoride resin was dissolved in 0.6 ml of heavy dimethyl sulfoxide at 100° C., $^{19}$F-NMR spectrum was measured at 100° C., and the composition of the polyvinylidene fluoride resin was determined from the NMR spectrum.

[Average Particle Diameter of Resin Particle]

Resin particles were dispersed in water to measure the particle diameter of the resin particle by using a laser diffraction particle size analyzer (MASTERSIZER 2000 manufactured by SYSMEX CORPORATION), and the median particle diameter (D50) in the volume particle size distribution was designated as the average particle diameter.

[CPVC of Filler]

The linseed oil absorption amount per unit mass was measured in accordance with JIS K-5101-13-1(2004), and the CPVC of the filler was calculated by the following formula.

CPVC (% by volume) of filler=linseed oil absorption amount per unit mass (ml/g)×specific gravity (g/cm$^3$) of filler×100

[Volume Proportion Vf of Filler]

The volume proportion Vf of the filler in the heat resistant porous layer was calculated by the following formula.

volume proportion $Vf$ (% by volume) of filler=volume per unit area (cm$^3$/m$^2$) of filler/ volume per unit area (cm$^3$/m$^2$) of heat resistant porous layer×100

The volume per unit area (cm$^3$/m$^2$) of the filler was obtained by dividing the weight per unit area (g/m$^2$) of the filler by the specific gravity (g/cm$^3$) of the filler. The weight per unit area (g/m$^2$) of the filler was determined by the weight per unit area (basis weight, g/m$^2$) of the heat resistant porous layer and the composition ratio of the filler of the coating liquid for forming a heat resistant porous layer. The volume per unit area (cm$^3$/m$^2$) of the heat resistant porous layer was determined by the product of the thickness of the heat resistant porous layer and unit area.

[Film Thickness]

The film thickness (μm) of the separator or the like was determined by measuring arbitrary 20 points in a 10 cm×30 cm area with a contact type thickness gauge (LITEMATIC manufactured by Mitutoyo Corporation), and averaging the measured values. The measuring probe used had a cylindrical shape having a diameter 5 mm, and adjustment was performed such that a load of 7 g was applied during measurement.

The thickness of the heat resistant porous layer was determined by subtracting the thickness of the porous substrate from the thickness of a stacked body of the porous substrate and a heat resistant porous layer. The thickness of the adhesive porous layer was determined by subtracting the thickness of a stacked body of the porous substrate, the heat resistant porous layer and the adhesive porous layer from the thickness of a stacked body of the porous substrate and the heat resistant porous layer.

[Basis Weight]

The basis weight (mass per 1 m$^2$) was determined by cutting a sample into a 10 cm×30 cm piece, measuring the mass of the piece, and dividing the mass by the area.

[Content of Filler in Heat Resistant Porous Layer]

By subtracting the basis weight of the porous substrate from the basis weight of a stacked body of the porous substrate and the heat resistant porous layer, the mass per unit area (g/m$^2$) of the heat resistant porous layer was determined. The content (g/m$^2$) of the filler in the heat resistant porous layer was then calculated from the composition ratio of the filler of the coating liquid for forming a heat resistant porous layer. The thus calculated content of the filler is the total amount on both sides of the porous substrate.

[Porosity]

The porosity of each layer was determined by the following calculation method.

Setting the constituent materials to a, b, c, . . . , n, the weights of the constituent materials to Wa, Wb, Wc, . . . , Wn(g/cm$^2$), the true densities of the constituent materials da, db, dc, . . . , dn (g/cm$^3$), and the film thickness of a layer of interest to t(cm), the porosity ε (%) is determined by the following formula.

ε={1−(Wa/da+Wb/db+Wc/dc+ . . . +Wn/dn)/t}×100

The average of the porosity of the heat resistant porous layer and the porosity of the adhesive porous layer (the average porocity of the coating layer) was calculated by the following formula. In the following formula, each of the thicknesses of the heat resistant porous layer and the thickness of the adhesive porous layer is the total value of both sides thereof.

average porosity (%)={porosity (%) of heat resistant porous layer×thickness (μm) of heat resistant porous layer+porosity (%) of adhesive porous layer×thickness (μm) of adhesive porous layer}÷{thickness (μm) of heat resistant porous layer+thickness (μm) of adhesive porous layer}

[Gurley Value]

The Gurley value (sec/100 cc) was measured by using a Gurley type densometer (G-B2C, manufactured by Toyo Seiki Sensaku-Sho, Ltd.) in accordance with JIS P8117 (2009).

[Flow Elongation Deformation Temperature of Thermoplastic Resin]

A porous substrate was cut into a 3 mm (TD direction)×16 mm (MD direction) piece and a 3 mm (MD direction)×16 mm (TD direction) piece. A sample was placed into a TMA measurement device (Q400 V22.4 Build 30 manufactured by TA Instruments Japan Inc.), a TMA (thermomechanical analysis) was performed at a temperature-rising rate of 5° C./min. while applying a load of 19.6 mN in the longitudinal direction of the sample, and a TMA chart was prepared by plotting the temperature along the horizontal axis and the sample length along the vertical axis for each of the MD direction and the TD direction. For each of the MD direction and the TD direction, the temperature at which the elongation percentage of the sample was 15% was determined from the TMA chart, and the average of the temperatures for the MD direction and the TD direction was calculated, thereby obtaining the flow elongation deformation temperature of a thermoplastic resin that is a component of the porous substrate.

[Thermal Dimensional Change Ratio]

A separator was cut into a 3 mm (TD direction)×16 mm (MD direction) piece and a 3 mm (MD direction)×16 mm (TD direction) piece. A sample was placed into a TMA measurement device (Q400 V22.4 Build 30 manufactured by TA Instruments Japan Inc.) to perform a TMA under conditions such that the temperature-rising rate was 5° C./min. and the target temperature was the flow elongation deformation temperature of thermoplastic resin, while applying a load of 19.6 mN in the longitudinal direction of the sample, a TMA chart was prepared by plotting the temperature along the horizontal axis and the sample length along the vertical axis for each of the MD direction and the TD direction. From the TMA chart, the maximum change amount of the separator was extracted, the absolute value of the maximum change amount was defined as a maximum deformation amount, and the thermal dimensional change ratio was calculated by the following formulae.

thermal dimensional change ratio (%) in MD direction=(maximum deformation amount in MD direction)/(length in MD direction before heating)×100 thermal dimensional change ratio (%) in TD direction=(maximum deformation amount in TD direction)/((length in TD direction before heating)×100

[Thermal Shrinkage Ratio]

A separator was cut into a 18 cm (MD direction)×6 cm (TD direction) test piece. On a line which divides the test piece into two in the TD direction, two marks were placed on two points (point A and point B) at 2 cm and 17 cm from one end, respectively. On a line which divides the test piece into two in the MD direction, two marks were placed on two points (point C and point D) at 1 cm and 5 cm from one end, respectively. The test piece was held by a clip at a point between the edge of the piece nearest to the point A and the point A, and the test piece was suspended in an oven at 150° C. (or 130° C.) such that the MD direction of the piece was the gravity direction to perform a heat treatment for 30 minutes without a tension. The lengths AB and the lengths CD before and after the heat treatment were measured and the thermal shrinkage ratio (%) was calculated by the following formula.

thermal shrinkage ratio (%) in MD direction=
{(length AB before heat treatment−length AB after heat treatment)/length AB before heat treatment}×100 thermal shrinkage ratio (%) in TD direction={(length CD before heat treatment−length CD after heat treatment)/length CD before heat treatment}×100

[Film Resistance (1)]

A separator was cut into a piece having as size of 2.6 cm×2.0 cm, and the piece was immersed in a methanol solution in which 3% by mass of nonionic surfactant (EMULGEN 210P, manufactured by Kao Corporation) was dissolved, followed by air drying. An aluminum foil having a thickness 20 μm was cut into a 2.0 cm×1.4 cm piece and a lead tab was attached thereto. Two pieces of such aluminum foil were prepared, and a separator which was cut out was sandwiched between them so as not to cause a short circuit, and the separator was impregnated with 1M LiBF4-propylene carbonate/ethylene carbonate (mass ratio 1/1) which is an electrolyte. The obtained product was enclosed in an aluminum laminate pack with reduced pressure such that the tab was exposed outside the aluminum pack. Such cells were manufactured such that one, two, or three separators were present in the aluminum foil. The cell was placed in a thermostat, and the resistance of the cell was measured by an alternating current impedance method under conditions of an amplitude of 10 mV, and a frequency of 100 kHz at a temperature of 20° C. The measured resistance values of the cell were plotted with respect to the number of the separators, and the plots were linearly approximated to determine the slope. The slope was multiplied by the area of an electrode which is 2.0 cm×1.4 cm to determine the film resistance (ohm·cm$^2$) per one separator.

[Film Resistance (2)]

The separator was impregnated with 1M LiBF4-propylene carbonate/ethylene carbonate (mass ratio 1/1) as the electrolyte, and the separator was sandwiched by aluminum foil electrodes having a lead tab, and the resulting product was enclosed in an aluminum pack to manufacture a test cell. The resistance (ohm·cm$^2$) of the test cell was measured by an alternating current impedance method (measurement frequency: 100 kHz) at a temperature of 20° C.

[Handling Properties (1)]

The handling properties of a separator without an adhesive porous layer was evaluated by the following method.

When a separator was cut into a 100 mm×100 mm piece by using a stainless razor, the existence of a peel of the heat resistant porous layer around a cutting portion was observed with naked eyes to perform evaluation in accordance with the following evaluation criteria.

G: Peel was not observed

NG: Peel was observed

[Handling Properties (2)]

The handling properties of a separator with an adhesive porous layer was evaluated by the following method.

When a separator was conveyed under conditions (conveying speed: 40 m/min., unwinding tension: 0.3 N/cm, winding tension: 0.1 N/cm), a peel of an adhesive porous layer was observed with naked eyes to perform evaluation in accordance with the following evaluation criteria. As a foreign matter generated by peeling fell off from the separator, a matter fell off from the separator, a matter trapped by the end face of a winding roll, and a matter observed on the surface of the roll were counted.

A: No peeling

B: Foreign matters generated by peeling: from one to five per 1000 m$^2$

C: Foreign matters generated by peeling: from six to 20 per 1000 m$^2$

D: Foreign matters generated by peeling: 21 or more per 1000 m$^2$

[Slit Properties]

The slit properties of a separator with an adhesive porous layer was evaluated by the following method.

While conveying the separator horizontally under the conditions of conveying speed of 40 m/min., unwinding tension of 0.3 N/cm, and winding tension of 0.1 N/cm, a stainless razor was applied to the separator at an angle of 60° to perform a slit treatment. A chip derived from the adhesive porous layer having a size of 0.5 mm or more is counted with naked eyes to perform evaluation in accordance with the following evaluation criteria. A chip fell off from the separator, and a chip observed on the slit end face were counted.

A: Number of chips having a size of 0.5 mm or more derived from the adhesive porous layer: 5 or less B: Number of chips having a size of 0.5 mm or more derived from the adhesive porous layer: from 6 to 10

C: Number of chips having a size of 0.5 mm or more derived from the adhesive porous layer: from 11 to 20

D: Number of chips having a size of 0.5 mm or more derived from the adhesive porous layer: 21 or more

[Peel Strength]

A separator with an adhesive porous layer was subjected to a T-peeling test. Specifically, a separator on both surfaces of which mending tapes manufactured by 3M Japan Limited were sticked was cut into a 10 mm width stripe, and ends of the mending tape were drawn at a rate of 20 mm/min. using a tension tester (RTC-1210A, manufactured by ORIENTEC Co., Ltd.), and the stress was measured to create a SS-curve. On the SS-curve, tensions from 10 mm to 40 mm were extracted at a pitch of 0.4 mm and the tensions were averaged. Further, the results for three test pieces were averaged, thereby obtaining a peel strength.

[Adhesion to Electrode]

Each of ten test batteries were disassembled and the degree of force needed to peel each of a negative electrode and a positive electrode from a separator was measured using a tension tester, and 20 measurement values in total were averaged. For a separator on only one side of which an adhesive porous layer was formed, the degree of force needed to peel an electrode which was in contact with the adhesive porous layer from the separator was measured, and 10 measurement values in total were averaged. Setting the index of the degree of force in Example 101 or Example 201 to 100, the index of each of the Examples and Comparative Examples was calculated, and evaluation was performed in accordance with the following evaluation criteria.

A: 60 or more
B: 40 or more but less than 60
C: less than 40

[Cycle Characteristics (Capacity Retention Rate)]

Charge/discharge was repeated for 10 test batteries under the environment of 30° C. with charging conditions of constant-current and constant-voltage charging of 1 C and 4.2V, and discharging conditions of cutoff constant-current discharging of 1 C, 2.75V. The value obtained by dividing the discharging capacity at the 300-th cycle by the initial capacity was defined as a capacity retention rate (%), and the average for ten test batteries were calculated.

[Oven Test]

Ten test batteries were charged to 4.2 V, and placed in an oven, and then a 5 kg weight was placed thereon. The oven was set in this state such that the temperature of the battery rose at a rate of 2° C./min., and the temperature of the oven was raised to a temperature of 150° C., and the change in the voltage of the battery was observed and evaluated according to the following criteria:

G: Almost no change in voltage of battery was observed in all of the 10 batteries in a temperature range up to 150° C.

NG: Sharp decrease in voltage of battery was observed at a temperature around 150° C. in at least one battery.

[Short Circuit Tests (1) and (2)]

Three or five test batteries were subjected to forced internal short circuit test according to JIS C8714 (2007). The results were evaluated according to the following criteria:

—Short circuit test (1): Number of test batteries: 3—
A: No battery fired.
B: One battery fired.
C: Two or three batteries fired.

—Short circuit test (2): Number of test batteries: 5—
AA: No battery fired.
A: One battery fired.
B: Two or 3 batteries fired.
C: Four or five batteries fired.

[Oxidation Resistance]

Ten test batteries were charged at a constant electric current and a constant voltage of 8 mA/4.3 V at 60° C. for 10 hours. After 100 hours charging, the batteries were disassembled and the separators were visually observed and evaluated according to the following evaluation criteria: Coloring is less likely to occur when the separator has a high oxidation resistance.

G: Coloring was not observed in separator.
NG: Coloring was observed in separator.

First Embodiment of Invention

The separators according to the first embodiment of the present invention, and batteries using the separators were produced and performances of the separators and the batteries were evaluated.

Example 1

Production of Separator

A water-based emulsion containing resin particles having an average particle diameter of 250 nm, which particles were a mixture of 70% by mass of polyvinylidene fluoride resin (poly(vinylidene fluoride-co-hexafluoropropylene) (PVDF-HFP, molar ratio 95/5) and 30% by mass of an acrylic polymer was provided.

As an inorganic filler, magnesium hydroxide ($Mg(OH)_2$) having an average particle diameter of 880 nm, specific gravity of 2.35 $g/cm^3$, and CPVC of 43% by volume was provided.

A water-based emulsion containing the resin particles, magnesium hydroxide, carboxymethylcellulose (CMC), ion-exchanged water and 2-propanol were mixed and the mixture was subjected to dispersion treatment to obtain a coating liquid having a solid content of 28.4% by mass for forming a heat-resistant porous layer. The coating liquid was adjusted to attain a ratio of inorganic filler, resin particles and CMC of 94.0/5.0/1.0 and to attain a ratio of ion-exchanged water and 2-propanol of 72.7/27.3.

The coating liquid for forming heat resistant porous layer was coated on one side of a polyethylene microporous membrane (film thickness 20 µm, Gurley value 170 sec/100 cc, porosity 43%, flow elongation deformation temperature of polyethylene of 138.1° C.) using a #6 bar coater, and the coated liquid was dried at 60° C.

By these operations, a separator in which a heat resistant porous layer, which was an aggregate of the resin particles and the inorganic filler, was formed on one side of the polyethylene microporous membrane was obtained.

[Production of Test Battery]

—Production of Negative Electrode—

300 g of artificial graphite as a negative electrode active material, 7.5 g of a water-soluble dispersion including a modified form of a styrene-butadiene copolymer in an amount of 40% by mass as a binder, 3 g of carboxymethyl cellulose as a thickener, and a proper quantity of water were stirred using a double-arm mixer, thereby preparing a slurry for forming a negative electrode. This slurry for forming a negative electrode was coated on a copper foil having a thickness of 10 µm as a negative electrode current collector, and the resulting coated membrane was dried, followed by pressing, to produce a negative electrode having a negative electrode active material layer.

—Production of Positive Electrode—

89.5 g of lithium cobalt oxide powder as a positive electrode active material, 4.5 g of acetylene black as an electrically conductive additive, and 6 g of polyvinylidene fluoride as a binder were dissolved in N-methyl-2-pyrrolidone such that the content of the polyvinylidene fluoride was 6% by mass, and the obtained solution was stirred using a double-arm mixer, thereby preparing a slurry for forming a positive electrode. This slurry for forming a positive electrode was coated on an aluminum foil having a thickness of 20 µm as a positive electrode current collector, and the resulting coated membrane was dried, followed by pressing, to produce a positive electrode having a positive electrode active material layer.

—Production of Battery—

A lead tab was welded to each of the positive electrode and negative electrode. Then, the positive electrode, a separator and the negative electrode were stacked in this order to produce a stacked body. The stacked body was impregnated with an electrolyte, and enclosed in an aluminum laminated film pack. Here, 1 M LiPF6-ethylene carbonate/ethyl methyl carbonate (mass ratio: 3/7) was used as the electrolyte. Next, using a vacuum sealer, the inside of the pack was made vacuum, and the pack was tentatively sealed, and, using a heat press machine, the stacked body together with the pack was subjected to a heat pressing, thereby bonding the electrode and the separator and sealing the pack. The heat pressing conditions were 20 kg of load per 1 cm$^2$ of the electrode, a temperature of 90° C., and two minutes of pressing time.

Example 2

A coating liquid having a solid content of 28.4% by mass for forming a heat resistant porous layer was manufactured in the same manner as in Example 1, except that the mass ratio of inorganic filler, resin particles, and CMC was changed as shown in Table 1.

Equal amounts of the coating liquid for forming heat resistant porous layer were coated on the both sides of a polyethylene microporous membrane (film thickness 9 μm, Gurley value 160 sec/100 cc, porosity 43%, flow elongation deformation temperature of polyethylene of 140.4° C.) using a #6 bar coater, and the coated liquid was dried at 60° C.

By these operations, a separator in which a heat resistant porous layer, which was an aggregate of the resin particles and the inorganic filler, was formed on the both sides of the polyethylene microporous membrane was obtained. Using this separator, a test battery was manufactured in the same manner as in Example 1.

Example 3 to 5 and 7 to 9

Separators were obtained by the same manner as in Example 2, except that the mass ratios of inorganic filler, resin particles, and CMC in the coating liquid for forming a heat-resistant porous layer were changed as shown in Table 1, and the amount of the coated liquid was changed as shown in Table 1. Further, using each of the thus obtained separators, test batteries were manufactured by the same manner as in Example 1.

Example 6

A separator was obtained by the same manner as in Example 2, except that the mass ratio of inorganic filler, resin particles, and CMC in the coating liquid for forming a heat-resistant porous layer was changed as shown in Table 1, and the coating liquid was coated on one side of the polyethylene microporous membrane. Further, using the thus obtained separator, a test battery was manufactured by the same manner as in Example 1.

Example 10

A water-based emulsion containing resin particles having an average particle diameter of 250 nm, which particles were a mixture of 70% by mass of polyvinylidene fluoride resin (PVDF-HFP, molar ratio 95/5) and 30% by mass of an acrylic polymer was provided.

As an inorganic filler, magnesium hydroxide ($Mg(OH)_2$) having an average particle diameter of 880 nm, specific gravity of 2.35 g/cm$^3$, and CPVC of 43% by volume was provided.

The water-based emulsion containing the resin particles, the magnesium hydroxide, CMC and ion-exchanged water were mixed and the mixture was subjected to dispersion treatment to manufacture a coating liquid having a solid content of 30.8% by mass for forming heat resistant porous layer. The coating liquid was adjusted to attain a mass ratio of the inorganic filler, resin particles and CMC of 73.8/25.0/1.2.

Equal amounts of the coating liquid for forming heat resistant porous layer were coated on the both sides of a polyethylene microporous membrane (film thickness 9 μm, Gurley value 160 sec/100 cc, porosity 43%, flow elongation deformation temperature of polyethylene of 140.4° C.) using a #6 bar coater, and the coated liquid was dried at 60° C.

By these operations, a separator in which a heat resistant porous layer, which was an aggregate of the resin particles and the inorganic filler, was formed on the both sides of the polyethylene microporous membrane was obtained. Using this separator, a test battery was manufactured in the same manner as in Example 1.

Example 11

A separator was obtained by the same manner as in Example 10, except that the mass ratio of inorganic filler, resin particles, and CMC in the coating liquid for forming a heat-resistant porous layer was changed as shown in Table 1, the solid content was changed to 31.4% by mass and that the amount of the coated liquid was changed as shown in Table 1. Further, using the thus obtained separator, a test battery was manufactured by the same manner as in Example 1.

Example 12

A water-based emulsion containing resin particles composed of styrene-butadiene rubber (SBR) having an average particle diameter of 150 nm was provided.

As an inorganic filler, magnesium hydroxide having an average particle diameter of 880 nm, specific gravity of 2.35 g/cm$^3$, and CPVC of 43% by volume was provided.

The water-based emulsion containing the resin particles, the magnesium hydroxide, CMC and ion-exchanged water were mixed and the mixture was subjected to dispersion treatment to manufacture a coating liquid having a solid content of 28.4% by mass for forming heat resistant porous layer. The coating liquid was adjusted to attain a mass ratio of the inorganic filler, resin particles and CMC of 94.0/5.0/1.0.

Equal amounts of the coating liquid for forming heat resistant porous layer were coated on the both sides of a corona treated polyethylene microporous membrane (film thickness 9 μm, Gurley value 160 sec/100 cc, porosity 43%, flow elongation deformation temperature of polyethylene of 140.4° C.) using a #6 bar coater, and the coated liquid was dried at 60° C.

By these operations, a separator in which a heat resistant porous layers, which was an aggregate of the resin particles and the inorganic filler, was formed on the both sides of the polyethylene microporous membrane was obtained. Using this separator, a test battery was manufactured in the same manner as in Example 1.

Example 13

A water-based emulsion containing resin particles having an average particle diameter of 250 nm, which particles were a mixture of 70% by mass of polyvinylidene fluoride resin (PVDF-HFP, molar ratio 95/5) and 30% by mass of an acrylic polymer was provided.

As an inorganic filler, α-alumina ($Al_2O_3$) having an average particle diameter of 1.0 μm, specific gravity of 3.95 g/cm$^3$, and CPVC of 58% by volume was provided.

The water-based emulsion containing the resin particles, the α-alumina, CMC and ion-exchanged water were mixed and the mixture was subjected to dispersion treatment to manufacture a coating liquid having a solid content of 28.4% by mass for forming a heat resistant porous layer. The coating liquid was adjusted to attain a mass ratio of the inorganic filler, resin particles and CMC of 98.5/1.0/0.5.

Equal amounts of the coating liquid for forming heat resistant porous layer were coated on the both sides of a corona treated polyethylene microporous membrane (film thickness 9 μm, Gurley value 160 sec/100 cc, porosity 43%, flow elongation deformation temperature of polyethylene of 140.4° C.) using a #6 bar coater, and the coated liquid was dried at 60° C.

By these operations, a separator in which a heat resistant porous layer, which was an aggregate of the resin particles and the inorganic filler, was formed on the both sides of the polyethylene microporous membrane was obtained. Using this separator, a test battery was manufactured in the same manner as in Example 1.

Example 14

A separator was obtained by the same manner as in Example 13, except that the α-alumina was replaced with magnesium oxide (MgO) (average particle diameter of 1.0 μm, specific gravity of 3.58 g/cm$^3$, and CPVC of 50% by volume), the mass ratio of inorganic filler, resin particles, and CMC in the coating liquid for forming a heat-resistant porous layer was changed as shown in Table 1, and that the amount of the coated liquid was changed as shown in Table 1. Further, using the thus obtained separator, a test battery was manufactured by the same manner as in Example 1.

Example 15

A separator was obtained by the same manner as in Example 13, except that the α-alumina was replaced with aluminum hydroxide ($Al(OH)_3$) (average particle diameter of 1.0 μm, specific gravity of 2.42 g/cm$^3$, and CPVC of 48% by volume), the mass ratio of inorganic filler, resin particles, and CMC in the coating liquid for forming a heat-resistant porous layer was changed as shown in Table 1, and that the amount of the coated liquid was changed as shown in Table 1. Further, using the thus obtained separator, a test battery was manufactured by the same manner as in Example 1.

Example 16

A separator was obtained by the same manner as in Example 13, except that the α-alumina was replaced with kaolin ($Al_4Si_4O_{10}(OH)_8$) (average particle diameter of 1.0 μm, specific gravity of 2.60 g/cm$^3$, and CPVC of 46% by volume), the mass ratio of inorganic filler, resin particles, and CMC in the coating liquid for forming a heat-resistant porous layer was changed as shown in Table 1, and that the amount of the coated liquid was changed as shown in Table 1. Further, using the thus obtained separator, a test battery was manufactured by the same manner as in Example 1.

Comparative Example 1

A separator was obtained by the same manner as in Example 2, except that the mass ratio of inorganic filler, resin particles, and CMC in the coating liquid for forming a heat-resistant porous layer were changed as shown in Table 1, the solid content was changed to 26.3% by mass and that the amount of the coated liquid was changed as shown in Table 1. Further, using the thus obtained separator, a test battery was manufactured by the same manner as in Example 1.

Comparative Example 2

A separator was obtained by the same manner as in Example 2, except that the mass ratio of inorganic filler, resin particles, and CMC in the coating liquid for forming a heat-resistant porous layer was changed as shown in Table 1, the solid content was changed to 35.3% by mass and that the amount of the coated liquid was changed as shown in Table 1. Further, using the thus obtained separator, a test battery was manufactured by the same manner as in Example 1.

Comparative Example 3

A water-based emulsion containing resin particles having an average particle diameter of 250 nm, which particles were a mixture of 70% by mass of polyvinylidene fluoride resin (PVDF-HFP, molar ratio 95/5) and 30% by mass of an acrylic polymer was provided. Further, polyethylene particles (CHEMIPEARL W100 manufactured by MITSUI CHEMICALS, INC., average particle diameter 3 μm) was provided.

As an inorganic filler, magnesium hydroxide ($Mg(OH)_2$) having an average particle diameter of 880 nm, specific gravity of 2.35 g/cm$^3$, and CPVC of 43% by volume was provided.

The water-based emulsion containing the resin particles, polyethylene particles including the polyvinylidene fluoride resin, magnesium hydroxide, CMC and ion-exchanged water were mixed and the mixture was subjected to dispersion treatment to manufacture a coating liquid having a solid content of 30.8% by mass for forming a heat resistant porous layer. The coating liquid was adjusted to attain a mass ratio of the inorganic filler, resin particles containing polyvinylidene fluoride resin, polyethylene particles and CMC of 54.5/3.6/36.4/5.5.

Equal amount of the coating liquid for forming heat resistant porous layer was coated on the both sides of a polyethylene microporous membrane (film thickness 9 μm, Gurley value 160 sec/100 cc, porosity 43%, flow elongation deformation temperature of polyethylene of 140.4° C.) using a #6 bar coater, and the coated liquid was dried at 60° C.

By these operations, a separator in which a heat resistant porous layer, which was an aggregate of the resin particles and the inorganic filler, was formed on the both sides of the polyethylene microporous membrane was obtained. Using this separator, a test battery was manufactured in the same manner as in Example 1.

The characteristics and evaluation results of the separators and the test batteries of Examples 1 to 16 and Comparative Examples 1 to 3 are shown in Table 1 and Table 2.

TABLE 1

| | Material of heat resistant porous layer | | | | Composition of heat resistant porous layer [mass %] | | |
|---|---|---|---|---|---|---|---|
| | Resin particles | Inorganic filler | CPVC [vol %] | Others | Inorganic filler | Resin particles | Others |
| Example 1 | PVDF | Mg(OH)$_2$ | 43 | CMC | 94.0 | 5.0 | 1.0 |
| Example 2 | PVDF | Mg(OH)$_2$ | 43 | CMC | 83.7 | 15.0 | 1.3 |
| Example 3 | PVDF | Mg(OH)$_2$ | 43 | CMC | 88.7 | 10.0 | 1.3 |
| Example 4 | PVDF | Mg(OH)$_2$ | 43 | CMC | 93.7 | 5.0 | 1.3 |
| Example 5 | PVDF | Mg(OH)$_2$ | 43 | CMC | 94.0 | 5.0 | 1.0 |
| Example 6 | PVDF | Mg(OH)$_2$ | 43 | CMC | 94.0 | 5.0 | 1.0 |
| Example 7 | PVDF | Mg(OH)$_2$ | 43 | CMC | 94.2 | 5.0 | 0.8 |
| Example 8 | PVDF | Mg(OH)$_2$ | 43 | CMC | 97.0 | 2.0 | 1.0 |
| Example 9 | PVDF | Mg(OH)$_2$ | 43 | CMC | 98.0 | 1.0 | 1.0 |
| Example 10 | PVDF | Mg(OH)$_2$ | 43 | CMC | 73.8 | 25.0 | 1.2 |
| Example 11 | PVDF | Mg(OH)$_2$ | 43 | CMC | 80.4 | 18.4 | 1.2 |
| Example 12 | SBR | Mg(OH)$_2$ | 43 | CMC | 94.0 | 5.0 | 1.0 |
| Example 13 | PVDF | alumina | 58 | CMC | 98.5 | 1.0 | 0.5 |
| Example 14 | PVDF | MgO | 50 | CMC | 94.0 | 5.0 | 1.0 |
| Example 15 | PVDF | Al(OH)$_3$ | 48 | CMC | 94.0 | 5.0 | 1.0 |
| Example 16 | PVDF | kaolin | 46 | CMC | 94.0 | 5.0 | 1.0 |
| Comparative Example 2 | PVDF | Mg(OH)$_2$ | 43 | CMC | 78.4 | 20.4 | 1.2 |
| Comparative Example 3 | PVDF, PE | Mg(OH)$_2$ | 43 | CMC | 54.5 | 40.0 | 5.5 |

| | Heat resistant porous layer | | | | | | | |
|---|---|---|---|---|---|---|---|---|
| | Provided on | Thickness (total) [μm] | Amount of coated liquid (dry weight) [g/m$^2$] | Inorganic filler content [g/m$^2$] | Porosity [%] | Vf [vol %] | Vf/CPVC | Porosity × Vf/CPVC [%] |
| Example 1 | one side | 12.1 | 9.5 | 8.9 | 65 | 31.4 | 0.73 | 47 |
| Example 2 | both sides | 9.1 | 8.5 | 7.1 | 57 | 33.3 | 0.77 | 44 |
| Example 3 | both sides | 13.8 | 12.1 | 10.7 | 60 | 33.1 | 0.77 | 46 |
| Example 4 | both sides | 10.1 | 8.8 | 8.2 | 61 | 34.7 | 0.81 | 49 |
| Example 5 | both sides | 12.2 | 10.5 | 9.8 | 62 | 34.4 | 0.80 | 50 |
| Example 6 | one side | 7.6 | 5.6 | 5.3 | 67 | 29.5 | 0.69 | 46 |
| Example 7 | both sides | 9.4 | 8.3 | 7.8 | 61 | 35.4 | 0.82 | 50 |
| Example 8 | both sides | 11.4 | 9.7 | 9.4 | 62 | 35.1 | 0.82 | 51 |
| Example 9 | both sides | 13.3 | 11.0 | 10.8 | 64 | 34.5 | 0.80 | 51 |
| Example 10 | both sides | 7.0 | 9.2 | 6.8 | 45 | 41.3 | 0.96 | 43 |
| Example 11 | both sides | 7.0 | 7.7 | 6.2 | 52 | 37.6 | 0.88 | 46 |
| Example 12 | both sides | 12.2 | 10.4 | 9.8 | 60 | 34.1 | 0.79 | 47 |
| Example 13 | both sides | 11.6 | 18.9 | 18.6 | 57 | 40.6 | 0.70 | 40 |
| Example 14 | both sides | 12.1 | 15.5 | 14.6 | 60 | 33.6 | 0.67 | 40 |
| Example 15 | both sides | 12.0 | 10.7 | 10.1 | 61 | 34.6 | 0.72 | 44 |
| Example 16 | both sides | 12.4 | 10.9 | 10.2 | 64 | 31.8 | 0.69 | 44 |
| Comparative Example 2 | both sides | 3.4 | 4.6 | 3.6 | 37 | 45.1 | 1.05 | 39 |
| Comparative Example 3 | both sides | 5.0 | 5.4 | 2.9 | 20 | 25.0 | 0.58 | 12 |

TABLE 2

| | Gurley value [sec/100 cc] | Film resistance (1) [ohm·cm$^2$] | Thermal dimensional change [%] | | Thermal shrinkage (150° C.) [%] | | Handling properties (1) | Oxidation resistance | Oven test | Cycle characteristics [%] |
|---|---|---|---|---|---|---|---|---|---|---|
| | | | MD | TD | MD | TD | | | | |
| Example 1 | 270 | 5.58 | 0.2 | 0.2 | 2.2 | 2.3 | G | G | G | 75 |
| Example 2 | 321 | 7.37 | 0.1 | 0.2 | 2.3 | 1.8 | G | G | G | 72 |
| Example 3 | 253 | 5.85 | 0 | 0.1 | 1.1 | 1.0 | G | G | G | 75 |
| Example 4 | 198 | 3.77 | 0 | 0.1 | 2.4 | 2.0 | G | G | G | 83 |
| Example 5 | 193 | 3.84 | 0 | 0.2 | 3.0 | 2.8 | G | G | G | 81 |
| Example 6 | 161 | 3.57 | 0.8 | 0.2 | 2.7 | 2.0 | G | G | G | 84 |
| Example 7 | 187 | 3.57 | 0.1 | 0.2 | 2.9 | 2.3 | G | G | G | 84 |
| Example 8 | 181 | 3.35 | 0 | 0.3 | 2.5 | 1.8 | G | G | G | 85 |
| Example 9 | 180 | 3.39 | 0 | 0.2 | 2.6 | 3.0 | G | G | G | 85 |
| Example 10 | 398 | 7.81 | 0.1 | 0.3 | 2.2 | 1.7 | G | G | G | 70 |
| Example 11 | 227 | 7.54 | 0.1 | 0.4 | 2.9 | 2.5 | G | G | G | 72 |
| Example 12 | 195 | 3.70 | 0.1 | 0.2 | 2.5 | 2.1 | G | NG | G | 70 |

TABLE 2-continued

|  | Gurley value [sec/100 cc] | Film resistance (1) [ohm·cm$^2$] | Thermal dimensional change [%] | | Thermal shrinkage (150° C.) [%] | | Handling properties (1) | Oxidation resistance | Oven test | Cycle characteristics [%] |
|---|---|---|---|---|---|---|---|---|---|---|
|  |  |  | MD | TD | MD | TD |  |  |  |  |
| Example 13 | 208 | 3.39 | 0 | 0.2 | 2.6 | 3.0 | G | G | G | 85 |
| Example 14 | 195 | 3.57 | 0.1 | 0.2 | 2.9 | 2.3 | G | G | G | 84 |
| Example 15 | 203 | 3.35 | 0 | 0.3 | 2.5 | 1.8 | G | G | G | 86 |
| Example 16 | 210 | 3.39 | 0 | 0.2 | 2.6 | 3.0 | G | G | G | 85 |
| Comparative Example 1 | 895 | 11.20 | 3.1 | 4.8 | 8.9 | 19.9 | G | G | NG | 51 |
| Comparative Example 2 | 316 | 9.03 | 0.1 | 0.2 | 2.3 | 1.8 | NG | G | G | 63 |
| Comparative Example 3 | 165 | 4.69 | 4.7 | 10.1 | 32.5 | 25.0 | G | NG | NG | 69 |

From the results shown in Table 2, it can be seen that the separators of Examples 1 to 6 are excellent in ion permeability and thermal dimensional stability, and that the test batteries manufactured by using the separators of Examples 1 to 6 are excellent in battery characteristics and safety.

With regard to the separators of Example 1 to Example 16, the moisture contents were measured by the following method.

The moisture was vaporized from each separator at 120° C. by using a moisture vaporizing device (model VA-100, manufactured by Mitsubishi Chemical Analytech, Co., Ltd.) and thereafter, the moisture content was measured using a Karl Fischer moisture meter (CA-100, manufactured by Mitsubishi Chemical Co., Ltd.). As a result, all the moisture contents of the separators of Example 1 to Example 16 were 1,000 ppm or less.

Second Embodiment of the Present Invention (1)

Separators according to the second embodiment of the present invention and batteries using these separators were manufactured, and the performances of the separators and the batteries were evaluated.

Example 101

Manufacturing of Separators

—Forming of Heat Resistant Porous Layer—

A water-based emulsion containing resin particles having an average particle diameter of 250 nm, which particles were a mixture of 70% by mass of polyvinylidene fluoride resin (PVDF-HFP, molar ratio 95/5) and 30% by mass of an acrylic polymer was provided.

As an inorganic filler, magnesium hydroxide (Mg(OH)$_2$) having an average particle diameter of 880 nm, specific gravity of 2.35 g/cm$^3$, and CPVC of 43% by volume was provided.

The magnesium hydroxide was dispersed in the water-based emulsion containing the resin particles to manufacture a coating liquid for forming heat resistant porous layer. The coating liquid was adjusted to attain a resin concentration of 7.4% by mass and to attain a ratio of the filler to the total of the resin and the filler of 90% by mass.

Equal amounts of the coating liquid for forming heat resistant porous layer were coated on the both sides of a polyethylene microporous membrane (film thickness 9 Gurley value 160 sec/100 cc, porosity 43%, flow elongation deformation temperature of polyethylene of 140.4° C.) using a bar coater, and the coated liquid was dried at 60° C.

By these operations, a stacked body in which a heat resistant porous layer, which was an aggregate of the resin particles and the inorganic filler, was formed on the both sides of the polyethylene microporous membrane was obtained.

—Forming of Adhesive Porous Layer—

A polyvinylidene fluoride resin (PVDF-HFP, molar ratio 97/3, weight-average molecular weight 1,000,000) was provided.

PVDF-HFP was dissolved in a mixed solvent of dimethylacetamide and tripropylene glycol (dimethylacetamide/tripropylene glycol=7/3 [mass ratio]) to a concentration of 5% by mass to manufacture a coating liquid for forming adhesive porous layer.

Equal amounts of the obtained coating liquid for forming adhesive porous layer were coated on the both sides of the stacked body and the resultant was immersed in a coagulating liquid (water/dimethylacetamide/tripropylene glycol=57/30/13 [mass ratio]) at 40° C. to solidify the coating liquid. The resultant was then washed with water and dried.

By these operations, a separator in which an adhesive porous layer composed of PVDF-HFP was formed on the both sides of the stacked body, was obtained.

[Manufacturing of Test Battery]
[Production of Test Battery]
—Production of Negative Electrode—

300 g of artificial graphite as a negative electrode active material, 7.5 g of a water-soluble dispersion including a modified form of a styrene-butadiene copolymer in an amount of 40% by mass as a binder, 3 g of carboxymethyl cellulose as a thickener, and a proper quantity of water were stirred using a double-arm mixer, thereby preparing a slurry for forming a negative electrode. This slurry for forming a negative electrode was coated on a copper foil having a thickness of 10 μm as a negative electrode current collector, and the resulting coated membrane was dried, followed by pressing, to produce a negative electrode having a negative electrode active material layer.

—Production of Positive Electrode—

89.5 g of lithium cobalt oxide powder as a positive electrode active material, 4.5 g of acetylene black as an electrically conductive additive, and 6 g of polyvinylidene fluoride as a binder were dissolved in N-methyl-2-pyrrolidone such that the content of the polyvinylidene fluoride was 6% by mass, and the obtained solution was stirred using a double-arm mixer, thereby preparing a slurry for forming a positive electrode. This slurry for forming a positive electrode was coated on an aluminum foil having a thickness of 20 μm as a positive electrode current collector, and the resulting coated membrane was dried, followed by pressing, to produce a positive electrode having a positive electrode active material layer.

—Production of Battery—

A lead tab was welded to each of the positive electrode and negative electrode. Then, the positive electrode, a separator and the negative electrode were stacked in this order to produce a stacked body. The stacked body was impregnated with an electrolyte, and enclosed in an aluminum laminated film pack. Here, 1 M $LiPF_6$-ethylene carbonate/ethyl methyl carbonate (mass ratio: 3/7) was used as the electrolyte. Next using a vacuum sealer, the inside of the pack was made vacuum and the pack was tentatively sealed, and, using a heat press machine, the stacked body together with the pack was subjected to a heat pressing, thereby bonding the electrode and the separator and sealing the pack. The heat pressing conditions were 20 kg of load per 1 $cm^2$ of the electrode, a temperature of 90° C., and two minutes of pressing time.

Examples 102 to 104

Separators were obtained by the same manner as in Example 101, except that the ratio of the filler to the total of the resin and the filler in the coating liquid for forming heat resistant porous layer was changed as shown in Table 3. Using the separators, test batteries were manufactured by the same manner as in Example 101.

Example 105

A separator was obtained by the same manner as in Example 101, except that the coating liquid was coated on one side of the polyethylene microporous membrane. Further, using the thus obtained separator, a test battery was manufactured by the same manner as in Example 101.

Example 106

A separator was obtained by the same manner as in Example 104, except that the coating liquid was coated on one side of the polyethylene microporous membrane. Further, using the thus obtained separator, a test battery was manufactured by the same manner as in Example 101.

Example 107

Forming of Heat Resistant Porous Layer

A water-based emulsion containing resin particles composed of styrene-butadiene rubber (SBR) having an average particle diameter of 150 nm was provided.

As an inorganic filler, magnesium hydroxide $(Mg(OH)_2)$ having an average particle diameter of 880 nm, specific gravity of 2.35 $g/cm^3$, and CPVC of 43% by volume was provided.

The magnesium hydroxide was dispersed in the water-based emulsion containing the SBR to manufacture a coating liquid for forming a heat resistant porous layer. The coating liquid was adjusted to attain an SBR concentration of 7.4% by mass and to attain a ratio of the filler to the total of the resin and the filler of 70% by mass.

Equal amounts of the coating liquid for forming heat resistant porous layer were coated on the both sides of a polyethylene microporous membrane (film thickness 9 Gurley value 160 sec/100 cc, porosity 43%, flow elongation deformation temperature of polyethylene of 140.4° C.) using a bar coater, and the coated liquid was dried at 60° C.

By these operations, a stacked body in which a heat resistant porous layer, which was an aggregate of the resin particles and the inorganic filler, was formed on the both sides of the polyethylene microporous membrane was obtained.

An adhesive porous layer was formed on both sides of the stacked body by the same manner as in Example 101 to obtain a separator. Further, using the thus obtained separator, a test battery was manufactured by the same manner as in Example 101.

Example 108

A separator was obtained by the same manner as in Example 107, except that the SBR concentration in the coating liquid for forming a heat resistant porous layer was changed to 5.0% by mass, the ratio of the filler to the total of the resin and the filler was changed to 80% by mass, and that the coating liquid was coated on one side of the polyethylene microporous membrane. Further, using the thus obtained separator, a test battery was manufactured by the same manner as in Example 101.

Example 109

Forming of Heat Resistant Porous Layer

A polyvinylidene fluoride resin (PVDF-HFP, molar ratio 97/3, weight-average molecular weight 1,000,000) was provided.

As a filler, magnesium hydroxide $(Mg(OH)_2)$ having an average particle diameter of 880 nm, specific gravity of 2.35 $g/cm^3$, and CPVC of 43% by volume was provided.

PVDF-HFP was dissolved in a mixed solvent of dimethylacetamide and tripropylene glycol (dimethylacetamide/tripropylene glycol=7/3 [mass ratio]) to a concentration of 5% by mass to manufacture a coating liquid for forming an adhesive porous layer. The coating liquid was adjusted to attain a ratio of the filler to the total of the resin and the filler of 90% by mass.

Equal amounts of the coating liquid for forming a heat resistant porous layer were coated on the both sides of a polyethylene microporous membrane (film thickness 9 µm, Gurley value 160 sec/100 cc, porosity 43%, flow elongation deformation temperature of polyethylene of 140.4° C.), and the resultant was immersed in a coagulating liquid (water/dimethylacetamide/tripropylene glycol=57/30/13 [mass ratio]) at 40° C. to solidify the coating liquid. The resultant was then washed with water and dried.

By these operations, a stacked body in which a heat resistant porous layer, which was an aggregate of the resin particles and the inorganic filler, was formed on the both sides of the polyethylene microporous membrane was obtained.

An adhesive porous layer was formed on both sides of the stacked body by the same manner as in Example 101 to obtain a separator. Further, using the thus obtained separator, a test battery was manufactured by the same manner as in Example 101.

Example 110

A separator was obtained by the same manner as in Example 109, except that PVDF-HFP was replaced with poly(vinylidene fluoride) (PVDF, weight average molecular weight of 1,000,000), and the ratio of the filler to the total of the resin and the filler was changed to 80% by mass. Further, using the thus obtained separator, a test battery was manufactured by the same manner as in Example 101.

Example 111

Forming of Heat Resistant Porous Layer

An aqueous solution containing polyvinyl alcohol (PVA) having a saponification value of 98 or more and an average polymerization degree of 2400 was provided.

As a filler, magnesium hydroxide ($Mg(OH)_2$) having an average particle diameter of 880 nm, specific gravity of 2.35 $g/cm^3$, and CPVC of 43% by volume was provided.

The magnesium hydroxide was dispersed in the water-based emulsion containing the PVA to manufacture a coating liquid for forming a heat resistant porous layer. The coating liquid was adjusted to attain a PVA concentration of 7.4% by mass and to attain a ratio of the filler to the total of the resin and the filler of 70% by mass.

Equal amounts of the coating liquid for forming a heat resistant porous layer were coated on the both sides of a polyethylene microporous membrane (film thickness 9 μm, Gurley value 160 sec/100 cc, porosity 43%, flow elongation deformation temperature of polyethylene of 140.4° C.) using a bar coater, and the coated liquid was dried at 60° C.

By these operations, a stacked body in which a heat resistant porous layer containing the resin and the filler was formed on the both sides of the polyethylene microporous membrane was obtained.

An adhesive porous layers was formed on both sides of the stacked body by the same manner as in Example 101 to obtain a separator. Further, using the thus obtained separator, a test battery was manufactured by the same manner as in Example 101.

Example 112

A separator was obtained by the same manner as in Example 101, except that the magnesium hydroxide was replaced with α-alumina ($Al_2O_3$) having an average particle diameter of 1.0 μm, specific gravity of 3.95 $g/cm^3$, and CPVC of 58% by volume), and the ratio of the filler to the total of the resin and the filler was changed to 65% by mass. Further, using the thus obtained separator, a test battery was manufactured by the same manner as in Example 101.

Example 113

A separator was obtained by the same manner as in Example 101, except that the magnesium hydroxide was replaced with magnesium oxide (MgO) (average particle diameter of 1.0 μm, specific gravity of 3.58 $g/cm^3$, and CPVC of 50% by volume), and the ratio of the filler to the total of the resin and the filler was changed to 70% by mass. Further, using the thus obtained separator, a test battery was manufactured by the same manner as in Example 101.

Example 114

A separator was obtained by the same manner as in Example 101, except that the magnesium hydroxide was replaced with aluminum hydroxide ($Al(OH)_3$) (average particle diameter of 1.0 μm, specific gravity of 2.42 $g/cm^3$, and CPVC of 48% by volume), and the ratio of the filler to the total of the resin and the filler was changed to 86% by mass. Further, using the thus obtained separator, a test battery was manufactured by the same manner as in Example 101.

Example 115

A separator was obtained by the same manner as in Example 101, except that the magnesium hydroxide was replaced with kaolin ($Al_4Si_4O_{10}(OH)_8$) (average particle diameter of 1.0 μm, specific gravity of 2.60 $g/cm^3$, and CPVC of 46% by volume), and the ratio of the filler to the total of the resin and the filler was changed to 50% by mass. Further, using the thus obtained separator, a test battery was manufactured by the same manner as in Example 101.

Example 116

A separator was obtained by the same manner as in Example 101, except that the magnesium hydroxide was replaced with talc ($Mg_3Si_4O_{10}(OH)_2$) (average particle diameter of 1.0 μm, specific gravity of 2.70 $g/cm^3$, CPVC of 51% by volume), and the ratio of the filler to the total of the resin and the filler was changed to 50% by mass. Further, using the thus obtained separator, a test battery was manufactured by the same manner as in Example 101.

Example 117

A separator was obtained by the same manner as in Example 101, except that the magnesium hydroxide was replaced with plate boehmite ($Al_2O_3 \cdot H_2O$) (average particle diameter of 1.2 μm, specific gravity of 2.70 $g/cm^3$, CPVC of 26% by volume), and the ratio of the filler to the total of the resin and the filler was changed to 50% by mass. Further, using the thus obtained separator, a test battery was manufactured by the same manner as in Example 101.

Example 118

A separator was obtained by the same manner as in Example 101, except that the magnesium hydroxide was replaced with plate calcium carbonate ($CaCO_3$) (average particle diameter of 1.1 μm, specific gravity of 2.60 $g/cm^3$, CPVC of 24% by volume), and the ratio of the filler to the total of the resin and the filler was changed to 50% by mass. Further, using the thus obtained separator, a test battery was manufactured by the same manner as in Example 101.

Example 119

Forming of Heat Resistant Porous Layer

An aqueous solution containing polyvinyl alcohol (PVA) having a saponification value of 98 or more and an average polymerization degree of 2400 was provided.

As a filler, plate calcium carbonate ($CaCO_3$) (average particle diameter of 1.1 μm, specific gravity of 2.60 $g/cm^3$, CPVC of 24% by volume) was provided.

The plate calcium carbonate was dispersed in the water-based emulsion containing the PVA to manufacture a coating liquid for forming a heat resistant porous layer. The coating liquid was adjusted to attain a PVA concentration of 7.4% by mass and to attain a ratio of the filler to the total of the resin and the filler of 80% by mass.

Equal amounts of the coating liquid for forming heat resistant porous layer were coated on the both sides of a polyethylene microporous membrane (film thickness 9 μm, Gurley value 160 sec/100 cc, porosity 43%, flow elongation deformation temperature of polyethylene of 140.4° C.) using a bar coater, and the coated liquid was dried at 60° C.

By these operations, a stacked body including heat resistant porous layers containing the resin and the filler, which heat resistant porous layers were formed on the both sides of the polyethylene microporous membrane was obtained.

An adhesive porous layer was formed on both sides of the stacked body by the same manner as in Example 101 to obtain a separator. Further, using the thus obtained separator, a test battery was manufactured by the same manner as in Example 101.

Example 120

A separator was obtained by the same manner as in Example 101, except that poly(methyl methacrylate) (PMMA) resin having an average particle diameter of 1.8 μm was dispersed to a concentration of 2.1% by mass. Further, using the thus obtained separator, a test battery was manufactured by the same manner as in Example 101.

Example 121

A separator was obtained by the same manner as in Example 103, except that adhesive porous layers were formed by using a water-based emulsion containing resin particles of styrene-butadiene rubber (SBR) (average particle diameter of 150 nm) at a concentration of 5.0% by mass as the coating liquid for forming an adhesive porous layer, and by drying the coating liquid after coating. Further, using the thus obtained separator, a test battery was manufactured by the same manner as in Example 101.

Comparative Example 101

A separator was obtained by the same manner as in Example 101, except that the ratio of the filler to the total of the resin and the filler in the coating liquid for forming a heat resistant porous layer was changed to 70% by mass, and the adhesive porous layer was formed on one side. Further, using the thus obtained separator, a test battery was manufactured by the same manner as in Example 101.

Comparative Example 102

A separator was obtained by the same manner as in Example 101, except that the ratio of the filler to the total of the resin and the filler in the coating liquid for forming heat resistant porous layer was changed to 50% by mass, and the adhesive porous layer was formed on one side. Further, using the thus obtained separator, a test battery was manufactured by the same manner as in Example 101.

Comparative Example 103

A separator was obtained by the same manner as in Example 101, except that the heat resistant porous layers were not formed and the thickness of the adhesive porous layers were changed. Further, using the thus obtained separator, a test battery was manufactured by the same manner as in Example 101.

Comparative Example 104

A separator was obtained by the same manner as in Example 101, except that the ratio of the filler to the total of the resin and the filler in the coating liquid for forming heat resistant porous layer was changed to 99% by mass. Further, using the thus obtained separator, a test battery was manufactured by the same manner as in Example 101.

Comparative Example 105

A separator was obtained by the same manner as in Example 101, except that the concentration of the resin was changed to 7.0% by mass and the ratio of the filler to the total of the resin and the filler in the coating liquid for forming heat resistant porous layer was changed to 50% by mass. Further, using the thus obtained separator, a test battery was manufactured by the same manner as in Example 101.

Comparative Example 106

A separator was obtained by the same manner as in Example 101, except that a mixture of two types of magnesium hydroxide (a mixture obtained by mixing magnesium hydroxide having an average particle diameter of 0.8 μm and magnesium hydroxide having an average particle diameter of 0.2 μm at a mass ratio of 1:1, specific gravity of 2.36 g/cm$^3$, CPVC of 80% by volume) was used, and the ratio of the filler to the total of the resin and the filler in the coating liquid for forming a heat resistant porous layer was changed to 50% by mass. Further, using the thus obtained separator, a test battery was manufactured by the same manner as in Example 101.

The characteristics and evaluation results of the separators and the test batteries of Examples 101 to 121 and Comparative Examples 101 to 106 are shown in Table 3 and Table 4.

TABLE 3

| | PVDF | | | | | |
|---|---|---|---|---|---|---|
| | | | | Heat resistant porous layer | | |
| | | Material of heat resistant porous layer | | | Thickness | Ratio of filler to total of resin and |
| | Resin | Filler | CPVC [vol %] | Provided on | (total) [μm] | filler [mass %] |
| Example 101 | PVDF particles | Mg(OH)$_2$ | 43 | both sides | 5 | 90 |
| Example 102 | PVDF particles | Mg(OH)$_2$ | 43 | both sides | 5 | 80 |
| Example 103 | PVDF particles | Mg(OH)$_2$ | 43 | both sides | 5 | 70 |
| Example 104 | PVDF particles | Mg(OH)$_2$ | 43 | both sides | 5 | 50 |
| Example 105 | PVDF particles | Mg(OH)$_2$ | 43 | one side | 3 | 90 |
| Example 106 | PVDF particles | Mg(OH)$_2$ | 43 | one side | 3 | 50 |
| Example 107 | SBR particles | Mg(OH)$_2$ | 43 | both sides | 3 | 70 |

TABLE 3-continued

| | PVDF | | | | | |
|---|---|---|---|---|---|---|
| Example 108 | SBR particles | Mg(OH)$_2$ | 43 | one side | 3 | 80 |
| Example 109 | PVDF-HFP | Mg(OH)$_2$ | 43 | both sides | 5 | 90 |
| Example 110 | PVDF | Mg(OH)$_2$ | 43 | both sides | 5 | 80 |
| Example 111 | PVA | Mg(OH)$_2$ | 43 | both sides | 3 | 70 |
| Example 112 | PVDF particles | alumina | 58 | both sides | 3 | 65 |
| Example 113 | PVDF particles | MgO | 50 | both sides | 3 | 70 |
| Example 114 | PVDF particles | Al(OH)$_3$ | 48 | both sides | 3 | 86 |
| Example 115 | PVDF particles | kaolin | 46 | both sides | 5 | 50 |
| Example 116 | PVDF particles | talc | 51 | both sides | 5 | 80 |
| Example 117 | PVDF particles | plate boehmite | 26 | both sides | 5 | 50 |
| Example 118 | PVDF particles | plate CaCO$_3$ | 24 | both sides | 5 | 50 |
| Example 119 | PVA | plate CaCO$_3$ | 24 | both sides | 5 | 80 |
| Example 120 | PVDF particles | Mg(OH)$_2$ | 43 | both sides | 5 | 90 |
| Example 121 | PVDF particles | Mg(OH)$_2$ | 43 | both sides | 5 | 70 |
| Comparative Example 101 | PVDF particles | Mg(OH)$_2$ | 43 | both sides | 5 | 70 |
| Comparative Example 102 | PVDF particles | Mg(OH)$_2$ | 43 | both sides | 5 | 50 |
| Comparative Example 103 | — | — | — | — | — | — |
| Comparative Example 104 | PVDF particles | Mg(OH)$_2$ | 43 | both sides | 5 | 99 |
| Comparative Example 105 | PVDF particles | Mg(OH)$_2$ | 43 | both sides | 5 | 50 |
| Comparative Example 106 | PVDF particles | Mg(OH)$_2$ | 80 | both sides | 5 | 50 |

| | Heat resistant porous layer | | | Adhesive porous layer | | | | |
|---|---|---|---|---|---|---|---|---|
| | Porosity [%] | Vf [vol %] | Vf/ CPVC | Provided on | Resin | Filler | Thickness (total) [μm] | Porosity [%] |
| Example 101 | 54 | 40 | 0.93 | both sides | PVDF-HFP | — | 2 | 40 |
| Example 102 | 60 | 30 | 0.70 | both sides | PVDF-HFP | — | 2 | 40 |
| Example 103 | 66 | 22 | 0.51 | both sides | PVDF-HFP | — | 2 | 40 |
| Example 104 | 60 | 17 | 0.40 | both sides | PVDF-HFP | — | 2 | 40 |
| Example 105 | 54 | 40 | 0.93 | both sides | PVDF-HFP | — | 2 | 40 |
| Example 106 | 60 | 17 | 0.40 | both sides | PVDF-HFP | — | 2 | 40 |
| Example 107 | 56 | 22 | 0.51 | both sides | PVDF-HFP | — | 2 | 40 |
| Example 108 | 56 | 34 | 0.79 | both sides | PVDF-HFP | — | 2 | 40 |
| Example 109 | 63 | 30 | 0.70 | both sides | PVDF-HFP | — | 2 | 40 |
| Example 110 | 50 | 21 | 0.49 | both sides | PVDF-HFP | — | 2 | 40 |
| Example 111 | 61 | 22 | 0.51 | both sides | PVDF-HFP | — | 2 | 40 |
| Example 112 | 36 | 29 | 0.50 | both sides | PVDF-HFP | — | 2 | 40 |
| Example 113 | 53 | 25 | 0.50 | both sides | PVDF-HFP | — | 2 | 40 |
| Example 114 | 74 | 21 | 0.44 | both sides | PVDF-HFP | — | 2 | 65 |
| Example 115 | 44 | 23 | 0.50 | both sides | PVDF-HFP | — | 2 | 40 |
| Example 116 | 32 | 49 | 0.96 | both sides | PVDF-HFP | — | 2 | 40 |
| Example 117 | 54 | 18 | 0.69 | both sides | PVDF-HFP | — | 2 | 40 |
| Example 118 | 76 | 10 | 0.42 | both sides | PVDF-HFP | — | 2 | 40 |
| Example 119 | 78 | 22 | 0.92 | both sides | PVDF-HFP | — | 2 | 40 |
| Example 120 | 54 | 40 | 0.93 | both sides | PVDF-HFP | PMMA | 3 | 55 |

TABLE 3-continued

| | | | | PVDF | | | | |
|---|---|---|---|---|---|---|---|---|
| Example 121 | 66 | 22 | 0.51 | both sides | SRR particles | — | 2 | 44 |
| Comparative Example 101 | 53 | 30 | 0.70 | one side | PVDF-HFP | — | 1 | 40 |
| Comparative Example 102 | 50 | 22 | 0.51 | one side | PVDF-HFP | — | 2 | 40 |
| Comparative Example 103 | — | — | — | both sides | PVDF-HFP | — | 5 | 39 |
| Comparative Example 104 | 57 | 43 | 1.00 | both sides | PVDF-HFP | — | 2 | 40 |
| Comparative Example 105 | 62 | 16 | 0.37 | both sides | PVDF-HFP | — | 2 | 40 |
| Comparative Example 106 | 35 | 28 | 0.35 | both sides | PVDF-HFP | — | 2 | 40 |

TABLE 4

| | Thickness | Average porosity of coating layer | Gurley value | Film resistance (2) | Thermal shrinkage (MD direction) [%] | | Peel strength | Adhesion to electrode | Short circuit test (1) | Short circuit test (2) | Cycle characteristics |
|---|---|---|---|---|---|---|---|---|---|---|---|
| | [μm] | [%] | [sec/100 cc] | [ohm·cm²] | 150° C. | 130° C. | [N/cm] | | | | [%] |
| Example 101 | 16 | 50 | 340 | 3.2 | 6.2 | 4.7 | 0.07 | A | A | AA | 90 |
| Example 102 | 16 | 54 | 356 | 3.3 | 7.6 | 3.8 | 0.08 | A | A | AA | 89 |
| Example 103 | 16 | 59 | 375 | 3.4 | 11.3 | 5.7 | 0.13 | A | A | AA | 89 |
| Example 104 | 16 | 54 | 356 | 3.3 | 17.0 | 8.5 | 0.20 | A | A | AA | 89 |
| Example 105 | 14 | 48 | 444 | 3.8 | 9.0 | 4.7 | 0.12 | A | A | AA | 85 |
| Example 106 | 14 | 52 | 476 | 4.0 | 17.0 | 8.4 | 0.23 | A | A | AA | 79 |
| Example 107 | 14 | 50 | 454 | 3.9 | 11.3 | 5.8 | 0.05 | A | A | A | 81 |
| Example 108 | 14 | 50 | 330 | 3.4 | 13.0 | 6.6 | 0.06 | A | — | A | 82 |
| Example 109 | 16 | 56 | 335 | 3.3 | 10.2 | 5.0 | 0.07 | A | A | AA | 88 |
| Example 110 | 16 | 47 | 340 | 3.2 | 8.0 | 4.1 | 0.07 | A | — | AA | 85 |
| Example 111 | 14 | 53 | 481 | 4.0 | 11.3 | 5.6 | 0.18 | A | A | AA | 80 |
| Example 112 | 14 | 38 | 393 | 4.2 | 11.3 | 5.8 | 0.25 | A | A | AA | 76 |
| Example 113 | 14 | 48 | 441 | 3.8 | 11.3 | 5.7 | 0.20 | A | A | AA | 77 |
| Example 114 | 14 | 70 | 490 | 4.2 | 13.2 | 8.4 | 0.07 | B | A | AA | 74 |
| Example 115 | 16 | 43 | 307 | 3.0 | 12.2 | 5.7 | 0.24 | A | — | AA | 89 |
| Example 116 | 16 | 34 | 206 | 4.2 | 8.1 | 3.8 | 0.18 | A | — | AA | 75 |
| Example 117 | 16 | 50 | 338 | 3.5 | 2.8 | 0.5 | 0.15 | A | — | AA | 83 |
| Example 118 | 16 | 66 | 405 | 4.1 | 5.1 | 1.3 | 0.07 | A | — | AA | 78 |
| Example 119 | 16 | 67 | 358 | 3.3 | 8.4 | 3.5 | 0.06 | A | — | AA | 85 |
| Example 120 | 17 | 54 | 337 | 3.2 | 6.1 | 4.7 | 0.04 | B | A | AA | 90 |
| Example 121 | 16 | 60 | 375 | 3.4 | 11.3 | 5.8 | 0.11 | A | A | AA | 87 |
| Comparative Example 101 | 15 | 51 | 334 | 3.2 | 9.4 | 4.0 | 0.16 | C | C | B | 70 |
| Comparative Example 102 | 16 | 47 | 326 | 3.1 | 11.0 | 5.7 | 0.20 | C | — | A | 89 |
| Comparative Example 103 | 14 | 39 | 320 | 3.1 | not measureable | 50.0 | 0.15 | A | C | C | 85 |
| Comparative Example 104 | 16 | 52 | 282 | 3.5 | 2.0 | 0.0 | 0.02 | B | B | A | 72 |
| Comparative Example 105 | 16 | 56 | 362 | 3.6 | 30.0 | 13.0 | 0.14 | A | B | B | 78 |
| Comparative Example 106 | 16 | 36 | 362 | 3.6 | 21.0 | 9.4 | 0.25 | A | — | C | 80 |

From the results shown in Table 4, it can be seen that the separators of Examples 101 to 121 are excellent in ion permeability and thermal dimensional stability, and that the test batteries manufactured by using the separators of Examples 101 to 121 are excellent in battery characteristics and safety.

Second Embodiment of Invention (2)

Separators according to the second embodiment of the present invention and batteries using these separators were manufactured, and the performances of the separators and the batteries were evaluated.

Example 201

Manufacturing of Separators

—Forming of Heat Resistant Porous Layer—

A water-based emulsion containing resin particles having an average particle diameter of 250 nm, which particles were a mixture of 70% by mass of polyvinylidene fluoride-resin (PVDF-HFP, molar ratio 95/5) and 30% by mass of an acrylic polymer was provided.

As a filler, magnesium hydroxide (Mg(OH)$_2$) having an average particle diameter of 880 nm, specific gravity of 2.35 g/cm$^3$, and CPVC of 43% by volume was provided.

The water-based emulsion containing the resin particles, magnesium hydroxide, carboxymethylcellulose (CMC) and ion-exchanged water were mixed and the mixture was subjected to dispersion treatment to manufacture a coating liquid having a solid content of 24.8% by mass for forming a heat resistant porous layer. The coating liquid was adjusted to attain a mass ratio of the filler, resin particles and CMC of 96.0/3.0/1.0.

The coating liquid for forming heat resistant porous layer was coated on one side of a corona treated polyethylene microporous membrane (film thickness 9 μm, Gurley value 183 sec/100 cc, porosity 36%, flow elongation deformation temperature of polyethylene of 132.4° C.) using a gravure coater, and the coated liquid was dried at 60° C.

By these operations, a separator including a heat resistant porous layer which was an aggregate of the resin particles and the inorganic filler was formed on one side of the polyethylene microporous membrane was obtained.

—Forming of Adhesive Porous Layer—

PVDF-HFP having a polymerization ratio (molar ratio) of 98.9/1.1 and a weight average molecular weight of 1,950,000 was mixed with PVDF-HFP having a polymerization ratio (molar ratio) of 95.2/4.8 and a weight average molecular weight of 470,000 was mixed at a mass ratio of 1:1.

This mixture was dissolved in a mixed solvent of dimethylacetamide and tripropylene glycol (dimethylacetamide/tripropylene glycol=8/2 [mass ratio]) to a concentration of 5% by mass to manufacture a coating liquid for forming adhesive porous layer.

Equal amounts of the obtained coating liquid for forming adhesive porous layer were coated on the both sides of the stacked body and the resultant was immersed in a coagulating liquid (water/dimethylacetamide/tripropylene glycol=57/30/13 [mass ratio]) at 40° C. to solidify the coating liquid. The resultant was then washed with water and dried.

By these operations, a separator including an adhesive porous layer composed of PVDF-HFP was formed on one side of the polyethylene microporous membrane was obtained. Further, using the thus obtained separator, a test battery was manufactured by the same manner as in Example 101.

Example 202

A separator was obtained by the same manner as in Example 201 except that the mass ratio of the filler, resin particles and CMC in the coating liquid for forming heat resistant porous layer was changed to 94.0/5.0/1.0. Further, using the thus obtained separator, a test battery was manufactured by the same manner as in Example 101.

Example 203

A separator was obtained by the same manner as in Example 201 except that a PVDF resin emulsion (KYNAR AQUATEC (registered trademark) manufactured by Arkema Inc.) was further added to the coating liquid for forming heat resistant porous layer, and the mass ratio of the filler, resin particles, KYNAR AQUATEC (registered trademark) and CMC in the coating liquid for forming heat resistant porous layer was changed to 81.0/9.0/9.0 (solid content)/1.0. Further, using the thus obtained separator, a test battery was manufactured by the same manner as in Example 101.

Example 204

A separator was obtained by the same manner as in Example 201 except that the mass ratio of the filler, resin particles and CMC in the coating liquid for forming heat resistant porous layer was changed to 78.0/20.0/2.0. Further, using the thus obtained separator, a test battery was manufactured by the same manner as in Example 101.

The characteristics and evaluation results of the separators and the test batteries of Examples 201 to 204 are shown in Table 5 and Table 6.

TABLE 5

| | Heat resistant porous layer | | | | | | | | Adhesive porous layer | | | |
| --- | --- | --- | --- | --- | --- | --- | --- | --- | --- | --- | --- | --- |
| | Provided on | Thickness [μm] | Amount of coated liquid (dry weight) [g/m²] | Ratio of filler to all materials [mass %] | CPVC of filler [vol %] | Porosity [%] | Vf [vol %] | Vf/CPVC | Provided on | Thickness (total) [μm] | Amount of coated liquid (dry weight) [g/m²] | Porosity [%] |
| Example 201 | one side | 2.3 | 2.4 | 96 | 43 | 54 | 42.6 | 0.99 | both sides | 2 | 2.0 | 48 |
| Example 202 | one side | 2.4 | 2.4 | 94 | 43 | 53 | 40.0 | 0.93 | both sides | 2 | 2.0 | 48 |
| Example 203 | one side | 2.3 | 2.2 | 81 | 43 | 65 | 33.0 | 0.77 | both sides | 2 | 2.0 | 48 |
| Example 204 | one side | 2.2 | 2.4 | 78 | 43 | 47 | 36.2 | 0.84 | both sides | 2 | 2.0 | 48 |

TABLE 6

| | Weight per unit area [g/m²] | Average porosity of coating layer [%] | Gurley value [sec/100 cc] | Film resistance (1) [ohm · cm²] | Thermal dimensional change [%] | | Peel strength [N/cm] | Handling properties (2) | Slit properties | Adhesion to electrode | Short circuit test (2) | Cycles characteristics [%] |
| --- | --- | --- | --- | --- | --- | --- | --- | --- | --- | --- | --- | --- |
| | | | | | MD | TD | | | | | | |
| Example 201 | 12.4 | 51.2 | 236 | 4.30 | 0.1 | 0.1 | 0.12 | A | A | A | AA | 89 |
| Example 202 | 12.4 | 50.7 | 240 | 4.40 | 0.1 | 0.1 | 0.15 | A | A | A | AA | 88 |

TABLE 6-continued

| | Weight per unit area [g/m$^2$] | Average porosity of coating layer [%] | Gurley value [sec/100 cc] | Film resistance (1) [ohm · cm$^2$] | Thermal dimensional change [%] | | Peel strength [N/cm] | Handling properties (2) | Slit properties | Adhesion to electrode | Short circuit test (2) | Cycles characteristics [%] |
|---|---|---|---|---|---|---|---|---|---|---|---|---|
| | | | | | MD | TD | | | | | | |
| Example 201 | 12.2 | 57.1 | 250 | 4.90 | 0.4 | 0.2 | 0.16 | A | A | A | AA | 81 |
| Example 204 | 12.4 | 47.5 | 387 | 6.48 | 0.7 | 1.2 | 0.16 | A | A | A | A | 72 |

From the results shown in Table 6, it can be seen that the separators of Examples 201 to 204 are excellent in ion permeability and thermal dimensional stability, and that the test batteries manufactured by using the separators of Examples 201 to 204 are excellent in battery characteristics and safety.

The disclosure of Japanese Patent Application No. 2012-262515 filed on Nov. 30, 2012, Japanese Patent Application No. 2012-262516 filed on Nov. 30, 2012, Japanese Patent Application No. 2013-056710 filed on Mar. 19, 2013, Japanese Patent Application No. 2013-056712 filed on Mar. 19, 2013 and Japanese Patent Application No. 2013-123873 filed on Jun. 12, 2013 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, comprising:
a porous substrate, and
a heat resistant porous layer that is provided on one side or both sides of the porous substrate, that is an aggregate of resin particles and an inorganic filler, and that satisfies the following expression (1):

$$0.65 \leq Vf/CPVC \leq 0.99 \qquad \text{expression (1)}$$

wherein, in expression (1), Vf is a volume proportion (% by volume) of the inorganic filler in the heat resistant porous layer, and CPVC is a critical pigment volume concentration (% by volume) of the inorganic filler,
wherein the aggregate of resin particles is configured that plural resin particles and plural filler particles are joined to form the aggregate in a layer form, and the aggregate is fixed on the surface of the porous substrate via at least part of the resin particles,
the resin particles include a resin selected from the group consisting of a polyvinylidene fluoride resin, fluoro rubber, styrene-butadiene rubber, ethylene-acrylate copolymer, ethylene-acrylic acid copolymer, polyethylene, ethylene-vinyl acetate copolymer, and a cross-linked acrylic resin, and
the inorganic filler accounts for 50% by mass or more and less than 90% by mass of the total amount of the resin particles and the inorganic filler in the heat resistant porous layer.

2. The separator for a non-aqueous secondary battery according to claim 1, wherein the heat resistant porous layer has a porosity of from 40% to 70%.

3. The separator for a non-aqueous secondary battery according to claim 2, wherein a product obtained by multiplying the value of the porosity of the heat resistant porous layer by the value of Vf/CPVC is from 40% to 60%.

4. The separator for a non-aqueous secondary battery according to claim 1, wherein a content of the inorganic filler in the heat resistant porous layer is from 2.0 g/m$^2$ to 20.0 g/m$^2$.

5. The separator for a non-aqueous secondary battery according to claim 1, wherein the critical pigment volume concentration of the inorganic filler is from 20% by volume to 70% by volume.

6. The separator for a non-aqueous secondary battery according to claim 1, wherein:
the porous substrate includes a thermoplastic resin, and
in a case in which the separator for a non-aqueous secondary battery is heated at a rate of temperature increase of 5° C./min. to a flow elongation deformation temperature of the thermoplastic resin, the separator for a non-aqueous secondary battery exhibits a thermal dimensional change ratio in a longitudinal direction of 3% or less and a thermal dimensional change ratio in a width direction of 3% or less.

7. The separator for a non-aqueous secondary battery according to claim 1, wherein, in a case in which the separator for a non-aqueous secondary battery is subjected to a heat treatment at 150° C. for 30 minutes, the separator for a non-aqueous secondary battery exhibits a thermal shrinkage ratio in a longitudinal direction of 3% or less and a thermal shrinkage ratio in a width direction of 3% or less.

8. The separator for a non-aqueous secondary battery according to claim 1, wherein the resin particles include a polyvinylidene fluoride resin.

9. The separator for a non-aqueous secondary battery according to claim 1, wherein the inorganic filler is magnesium hydroxide or magnesium oxide.

10. The separator for a non-aqueous secondary battery according to claim 1, wherein the heat resistant porous layer further comprises a thickener.

11. A non-aqueous secondary battery comprising:
a positive electrode,
a negative electrode, and
the separator for a non-aqueous secondary battery according to claim 1, which is disposed between the positive electrode and the negative electrode,
wherein, in the non-aqueous secondary battery, an electromotive force is obtained by lithium doping/dedoping.

12. The separator for a non-aqueous secondary battery according to claim 1, wherein the critical pigment volume concentration of the inorganic filler is from 20% by volume to 70% by volume, the inorganic filler is selected from the group consisting of magnesium hydroxide, alumina, magnesium oxide, aluminum hydroxide, kaolin, talc, plate boehmite, and plate calcium carbonate, and the resin particles include a polyvinylidene fluoride resin.

13. The separator for a non-aqueous secondary battery according to claim 1, wherein the critical pigment volume concentration of the inorganic filler is from 20% by volume to 70% by volume, the inorganic filler is magnesium hydroxide, and the resin particles include a polyvinylidene fluoride resin.

14. The separator for a non-aqueous secondary battery according to claim 1, wherein the inorganic filler accounts for 50% by mass or more and less than or equal to 86% by mass of the total amount of the resin particles and the inorganic filler in the heat resistant porous layer.

15. The separator for a non-aqueous secondary battery according to claim 1, wherein the inorganic filler accounts for 50% by mass or more and less than or equal to 80% by mass of the total amount of the resin particles and the inorganic filler in the heat resistant porous layer.

\* \* \* \* \*